US012706486B2

(12) United States Patent
Wu et al.

(10) Patent No.: US 12,706,486 B2
(45) Date of Patent: Aug. 11, 2026

(54) WIRELESS CHARGING DEVICE, ALIGNMENT METHOD, SYSTEM, AND CHARGING BASE

(71) Applicant: Huawei Digital Power Technologies Co., Ltd., Shenzhen (CN)

(72) Inventors: Donghao Wu, Shenzhen (CN); Baoshan Wu, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 799 days.

(21) Appl. No.: 18/086,278

(22) Filed: Dec. 21, 2022

(65) Prior Publication Data

US 2023/0127150 A1 Apr. 27, 2023

Related U.S. Application Data

(63) Continuation of application No. PCT/CN2021/110193, filed on Aug. 3, 2021.

(30) Foreign Application Priority Data

Sep. 9, 2020 (CN) ........................ 202010942024.4

(51) Int. Cl.

| | |
|---|---|
| ***H02J 50/90*** | (2016.01) |
| ***H02J 50/00*** | (2016.01) |
| ***H02J 50/12*** | (2016.01) |
| ***H02M 1/36*** | (2007.01) |
| ***H02M 3/335*** | (2006.01) |

(Continued)

(52) U.S. Cl.

CPC ........... *H02J 50/12* (2016.02); *H02J 50/005* (2020.01); *H02J 50/90* (2016.02); *H02M 1/36* (2013.01); *H02M 3/33573* (2021.05); *H02M 7/043* (2013.01); *H04B 5/266* (2024.01); *H04B 5/263* (2024.01)

(58) Field of Classification Search

CPC ........................................................ H02J 50/90
USPC ........................................................ 320/108
See application file for complete search history.

(56) References Cited

U.S. PATENT DOCUMENTS 9,859,730 B2 * 1/2018 Tojo ........................ H02J 50/90
2009/0079269 A1 * 3/2009 Jin .......................... H02J 50/70 307/104

(Continued)

FOREIGN PATENT DOCUMENTS

CN 108767995 A 11/2018
CN 110829615 A 2/2020

(Continued)

*Primary Examiner* — Ahmed H Omar

(57) ABSTRACT

A wireless charging device is provided in this disclosure, which includes a resonant network, an inverter circuit, and a controller. The resonant network includes a resonant capacitor and a transmitting coil. An input end of the inverter circuit is configured to connect to a direct current power supply, and an output end of the inverter circuit is configured to connect to the resonant network. The controller is configured to determine a moving direction of the transmitting coil based on a self-inductance of the transmitting coil or a resonant frequency of the resonant network, and control a movement of the transmitting coil based on the moving direction of the transmitting coil, to enable the wireless charging device to align with the electronic device.

15 Claims, 11 Drawing Sheets

(51) Int. Cl.

| | |
|---|---|
| ***H02M 7/04*** | (2006.01) |
| ***H04B 5/26*** | (2024.01) |

(56) References Cited

U.S. PATENT DOCUMENTS

| | | | | |
|---|---|---|---|---|
| 2009/0079271 | A1* | 3/2009 | Jin | H02J 7/00045 307/104 |
| 2013/0281155 | A1* | 10/2013 | Ogata | H02J 50/402 455/556.1 |
| 2018/0233954 | A1* | 8/2018 | Yang | H02J 50/12 |
| 2019/0190301 | A1 | 6/2019 | Takahashi | |
| 2019/0238007 | A1* | 8/2019 | Bober | H02J 7/00 |

FOREIGN PATENT DOCUMENTS

| | | | |
|---|---|---|---|
| CN | 112260411 | A | 1/2021 |
| WO | 2019183782 | A1 | 10/2019 |

* cited by examiner

RX
C
B
D
O
A
TX
E
F

Communicable area

RX

B

C

TX

θ

O

A

WIRELESS CHARGING DEVICE, ALIGNMENT METHOD, SYSTEM, AND CHARGING BASE

CROSS REFERENCE TO RELATED APPLICATIONS

This application is a continuation of International Application No. PCT/CN2021/110193, filed on Aug. 3, 2021, which claims priority to Chinese Patent Application No. 202010942024.4, filed on Sep. 9, 2020. The disclosures of the aforementioned applications are hereby incorporated by reference in their entireties.

TECHNICAL FIELD

This disclosure relates to the field of wireless charging technologies, and in particular, to a wireless charging device, alignment method, system, and charging base.

BACKGROUND

A wireless charging technology (WCT) uses conductive media such as an electric field, a magnetic field, a microwave, or a laser to implement wireless transmission of electric energy. Because of advantages such as no conductor restriction and no plugging, the wireless charging technology is increasingly widely used in electronic devices.

Currently, more and more electronic devices use wireless charging devices for wireless charging. For example, the electronic device may be a mobile phone or a wearable device. The wireless charging device includes a transmitting coil, and the electronic device includes a receiving coil. Wireless transmission of electric energy is implemented between the transmitting coil and the receiving coil through electromagnetic field coupling.

During wireless charging, the transmitting coil and the receiving coil need to be located within a specific space distance. For example, when the electronic device is a mobile phone or a wearable device, a position deviation between the transmitting coil in the wireless charging device and the receiving coil in the mobile phone is generally required to be less than 10 mm. If the position deviation between the transmitting coil and the receiving coil is extremely large, wireless charging cannot be implemented. If the deviation is small, wireless charging can be implemented. However, due to the deviation, charging efficiency is also affected.

Therefore, for better application of wireless charging, automatic alignment needs to be performed on the transmitting coil. To be specific, the transmitting coil is controlled to move to a position at which the receiving coil is aligned, thereby improving charging efficiency of wireless charging.

Currently, an automatic alignment solution provided in a conventional technology is to add a layer of small coil matrix on the transmitting coil and perform position detection by using the small coil matrix.

The small coil matrix may identify a position of the receiving coil and move the transmitting coil, so that the transmitting coil and the receiving coil are aligned.

However, when the small coil matrix is additionally added on the transmitting coil, the small coil matrix causes an extra loss and reduces charging efficiency during wireless charging. In addition, the small coil matrix itself is a type of metal, and therefore when the small coil matrix detects a foreign matter between the transmitting coil and the receiving coil, foreign matter detection may be inaccurate.

SUMMARY

To resolve the foregoing technical problem, this disclosure provides a wireless charging device, alignment method, system, and charging base, to implement automatic alignment between the wireless charging device and an electronic device, without causing an extra loss and affecting accuracy of foreign matter detection.

This embodiment of this disclosure provides a wireless charging device. The wireless charging device is configured to perform wireless charging on electronic devices such as a mobile phone or a wearable device. When a position of the electronic device placed on the wireless charging device is deviated, a receiving coil in the electronic device deviates from a transmitting coil. In this case, the wireless charging device may align the transmitting coil with the receiving coil by controlling a movement of the transmitting coil. A position deviation between the transmitting coil and the receiving coil has a monotonic relationship with a self-inductance of the transmitting coil. To be specific, the larger the position deviation, the smaller the self-inductance of the transmitting coil. The position deviation between the transmitting coil and the receiving coil has a monotonic relationship with a resonant frequency of a resonant network. To be specific, the larger the position deviation, the larger the resonant frequency. Therefore, position alignment of the transmitting coil may be implemented based on the self-inductance of the transmitting coil or the resonant frequency. In other words, a moving direction for the position alignment may be found based on the self-inductance of the transmitting coil or the resonant frequency, and a controller controls the transmitting coil to move along the moving direction, so that the position deviation between the transmitting coil and the receiving coil gradually becomes small.

In the wireless charging device provided in this embodiment, a coil matrix does not need to be added. Therefore, no extra loss is caused, and accuracy of foreign matter detection is not affected. The wireless charging device relies only on the controller to implement automatic alignment of the transmitting coil, and adjust relative positions of the transmitting coil and the receiving coil, to prepare for wireless charging. Because the wireless charging device can implement automatic alignment, a degree of freedom for the wireless charging device to perform wireless charging on the electronic device may be improved, and user experience may be improved.

The wireless charging device includes a resonant network, an inverter circuit, and a controller. The resonant network includes a resonant capacitor and a transmitting coil. An input end of the inverter circuit is connected to a direct current power supply, and an output end of the inverter circuit is connected to the resonant network. The controller determines a moving direction of the transmitting coil based on a self-inductance of the transmitting coil or a resonant frequency of the resonant network, and controls the movement of the transmitting coil based on the moving direction of the transmitting coil, to enable the wireless charging device to align with the electronic device. The self-inductance of the transmitting coil increases along the moving direction of the transmitting coil, and the resonant frequency decreases along the moving direction of the transmitting coil.

Preferably, to enable the transmitting coil to move, the wireless charging device further includes an alignment mechanism. Under control of the controller, the alignment mechanism drives the transmitting coil to move along the moving direction.

Preferably, the alignment mechanism includes at least an electric drive member, a first guide rail, and a second guide rail. The first guide rail and the second guide rail are perpendicular to each other. The electric drive member is configured to drive the transmitting coil to move along the first guide rail and the second guide rail. The controller is configured to control the electric drive member, so that the transmitting coil moves along the moving direction.

An implementation form of the electric drive member is not specifically limited in this embodiment of this disclosure. For example, the electric drive member may be a motor. The motor is powered, and the controller controls a rotation direction and a rotation speed of the motor. For example, two motors may be included: a first motor and a second motor. The first motor drives the transmitting coil to move along the first guide rail, and the second motor drives the transmitting coil to move along the second guide rail.

Preferably, when the wireless charging device is in a non-communicable area or a communicable area, the controller determines the moving direction of the transmitting coil based on the self-inductance of the transmitting coil or the resonant frequency of the resonant network. Especially in the non-communicable area, the moving direction needs to be determined based on the self-inductance or resonant frequency. The non-communicable area refers to an area where a ping signal can be transmitted but power cannot be received, and the communicable area refers to an area where a ping signal can be transmitted and power can be received. In the communicable area, the controller may alternatively determine the moving direction based on another charging parameter, which is described in detail later.

Preferably, an implementation is a center moving method. To be specific, the controller controls the transmitting coil to move around a center with an initial position as the center, to obtain a direction in which the self-inductance of the transmitting coil is the greatest in a moving process of the transmitting coil. The direction in which the self-inductance of the transmitting coil is the greatest is the moving direction. Moving around the center may be evenly moving around the center, may be spirally moving around the center, or may be unevenly moving around the center. This is not specifically limited in this embodiment of this disclosure.

Preferably, the transmitting coil may be controlled through a circumference movement. To be specific, the controller controls the transmitting coil to move on a circumference of a preset radius with the initial position as the center, to obtain the direction in which the self-inductance of the transmitting coil is the greatest in a process that the transmitting coil moves on the circumference. The preset radius may be selected based on a moving distance and a moving speed. In addition, the preset radius may alternatively be set based on alignment time. If the required alignment time is shorter, the preset radius may be set to a slightly larger value. Conversely, if the required alignment time is longer, the preset radius may be set to a slightly smaller value. In this embodiment of this disclosure, a quantity of sampling points selected when the transmitting coil moves on the circumference is not specifically limited, and may be selected based on the alignment time and a calculation precision.

Preferably, to speed up the alignment and shorten the alignment time, three vertices of a triangle may be used for moving. To be specific, during each iteration, only magnitudes of self-inductances of the transmitting coil at the three vertices of the triangle are considered. The controller controls the transmitting coil to move around a starting point separately to a first point and a second point with the initial position as the starting point. The starting point, the first point, and the second point form a triangle. The controller determines the moving direction based on a self-inductance of the transmitting coil corresponding to each of the first point and the second point.

Preferably, to reduce a calculation amount, accelerate the alignment, and shorten the time, three vertices of a right triangle may be used for moving. To be specific, magnitudes of self-inductances of the transmitting coil at the three vertices of the right triangle are sampled in each iteration, and a moving direction of a next step is determined based on the magnitudes of the self-inductances of the transmitting coil at the three vertices. As a trigonometric function corresponding to each angle of the right triangle is easy to calculate, calculation difficulty may be reduced by using the right triangle. The starting point is a common vertex of two right-angled sides of the right triangle, and the first point and the second point are other two vertices of the two right-angled sides respectively.

Preferably, the controller is configured to: in the non-communicable area, determine the moving direction based on the self-inductance of the transmitting coil or the resonant frequency of the resonant network. The controller is further configured to: when the wireless charging device and the electronic device are in a communicable area, determine the moving direction based on a charging parameter. The charging parameter monotonously changes along the moving direction determined based on the charging parameter.

Preferably, the charging parameter that monotonically increases with the movement along the moving direction determined based on the charging parameter includes at least one of the following:

the self-inductance of the transmitting coil, a charging frequency, charging efficiency, an output voltage of a rectifier circuit in the electronic device, a product of the self-inductance of the transmitting coil and an alternating current resistance of the transmitting coil, a mutual inductance between the transmitting coil and the receiving coil, a coupling coefficient between the transmitting coil and the receiving coil, a mutual inductance between the transmitting coil and an auxiliary coil, a coupling coefficient between the transmitting coil and the auxiliary coil, and an open-circuit voltage of an auxiliary coil in the electronic device. The charging parameter that monotonically decreases with the movement along the moving direction includes at least one of the following: a current of the transmitting coil and an input voltage of the inverter circuit.

Preferably, the controller in the wireless charging device may determine, based on whether a data packet sent by the electronic device is received, whether the wireless charging device enters the communicable area. To be specific, when the controller does not receive the data packet sent by the electronic device, and the self-inductance of the transmitting coil is greater than a preset threshold, the controller determines that the wireless charging device and the electronic device are in the non-communicable area. Herein, that when the self-inductance of the transmitting coil is greater than the preset threshold is relative to a self-inductance when there is no electronic device.

Preferably, the controller is further configured to obtain the self-inductance of the transmitting coil based on the resonant frequency of the resonant network and the resonant capacitor of the resonant network.

This embodiment of this disclosure further provides a wireless charging alignment method, which is applied to a wireless charging device. The wireless charging device is configured to perform wireless charging on electronic devices such as a mobile phone or a wearable device. When a position of the electronic device placed on the wireless charging device is deviated, a receiving coil in the electronic device deviates from a transmitting coil. In this case, the wireless charging device may align the transmitting coil with the receiving coil by controlling a movement of the transmitting coil. A position deviation between the transmitting coil and the receiving coil has a monotonic relationship with a self-inductance of the transmitting coil. To be specific, the larger the position deviation, the smaller the self-inductance of the transmitting coil. The position deviation between the transmitting coil and the receiving coil has a monotonic relationship with a resonant frequency of a resonant network. To be specific, the larger the position deviation, the larger the resonant frequency. Therefore, position alignment of the transmitting coil may be implemented based on the self-inductance of the transmitting coil or the resonant frequency. In other words, a moving direction for the position alignment may be found based on the self-inductance of the transmitting coil or the resonant frequency, and a controller controls the transmitting coil to move along the moving direction, so that the position deviation between the transmitting coil and the receiving coil gradually becomes small. The wireless charging device includes a resonant network, an inverter circuit, and a controller. The resonant network includes a resonant capacitor and a transmitting coil. An input end of the inverter circuit is configured to connect to a direct current power supply, and an output end of the inverter circuit is configured to connect to the resonant network. The method includes: obtaining the self-inductance of the transmitting coil or the resonant frequency of the resonant network; determining the moving direction of the transmitting coil based on the self-inductance of the transmitting coil or the resonant frequency of the resonant network; and controlling the movement of the transmitting coil based on the moving direction of the transmitting coil, to enable the wireless charging device to align with the electronic device. The self-inductance of the transmitting coil increases along the moving direction of the transmitting coil, and the resonant frequency decreases along the moving direction of the transmitting coil.

A coil matrix does not need to be added. Therefore, no extra loss is caused, and accuracy of foreign matter detection is not affected. The wireless charging device relies only on the controller to implement automatic alignment of the transmitting coil, and adjust relative positions of the transmitting coil and the receiving coil, to prepare for wireless charging. Because the wireless charging device can implement automatic alignment, a degree of freedom for the wireless charging device to perform wireless charging on the electronic device may be improved, and user experience may be improved.

Preferably, the determining the moving direction of the transmitting coil based on the self-inductance of the transmitting coil or the resonant frequency of the resonant network specifically includes: when the wireless charging device is at least in a non-communicable area, determining the moving direction of the transmitting coil based on the self-inductance of the transmitting coil or the resonant frequency of the resonant network.

Preferably, an implementation is a center moving method. Moving around a center may be evenly moving around the center, may be spirally moving around the center, or may be unevenly moving around the center. This is not specifically limited in this embodiment of this disclosure. The determining the moving direction of the transmitting coil based on the self-inductance of the transmitting coil specifically includes: controlling the transmitting coil to move around a center with an initial position as the center, to obtain a direction in which the self-inductance of the transmitting coil is the greatest in a moving process of the transmitting coil, where the direction in which the self-inductance of the transmitting coil is the greatest is the moving direction.

Preferably, the transmitting coil may be controlled through a circumference movement. The controlling the transmitting coil to move around a center with an initial position as the center specifically includes: controlling the transmitting coil to move on a circumference of a preset radius with the initial position as the center. The preset radius may be selected based on a moving distance and a moving speed. In addition, the preset radius may alternatively be set based on alignment time. If the required alignment time is shorter, the preset radius may be set to a slightly larger value. Conversely, if the required alignment time is longer, the preset radius may be set to a slightly smaller value. In this embodiment of this disclosure, a quantity of sampling points selected when the transmitting coil moves on the circumference is not specifically limited, and may be selected based on the alignment time and a calculation precision.

Preferably, to speed up the alignment and shorten the alignment time, three vertices of a triangle may be used for moving. To be specific, during each iteration, only magnitudes of self-inductances of the transmitting coil at the three vertices of the triangle are considered. The determining the moving direction of the transmitting coil based on the self-inductance of the transmitting coil specifically includes: controlling the transmitting coil to move around a starting point separately to a first point and a second point with the initial position as the starting point, where the starting point, the first point, and the second point form a triangle; and determining the moving direction based on a self-inductance of the transmitting coil corresponding to each of the first point and the second point.

Preferably, to reduce a calculation amount, accelerate the alignment, and shorten the time, three vertices of a right triangle may be used for moving. To be specific, magnitudes of self-inductances of the transmitting coil at the three vertices of the right triangle are sampled in each iteration, and a moving direction of a next step is determined based on the magnitudes of the self-inductances of the transmitting coil at the three vertices. As a trigonometric function corresponding to each angle of the right triangle is easy to calculate, calculation difficulty may be reduced by using the right triangle. The starting point is a common vertex of two right-angled sides of the right triangle, and the first point and the second point are other two vertices of the two right-angled sides respectively.

Preferably, in the non-communicable area, the determining the moving direction based on the self-inductance of the transmitting coil or the resonant frequency of the resonant network further includes: when the wireless charging device and the electronic device are in a communicable area, determining the moving direction based on a charging parameter. The charging parameter monotonously changes along the moving direction determined based on the charging parameter.

Preferably, the charging parameter that monotonically increases along the moving direction determined based on the charging parameter includes at least one of the following: the self-inductance of the transmitting coil, a charging frequency, charging efficiency, an output voltage of a rectifier circuit in the electronic device, a product of the self-inductance of the transmitting coil and an alternating current resistance of the transmitting coil, a mutual inductance between the transmitting coil and the receiving coil, a coupling coefficient between the transmitting coil and the receiving coil, a mutual inductance between the transmitting coil and an auxiliary coil, a coupling coefficient between the transmitting coil and the auxiliary coil, and an open-circuit voltage of an auxiliary coil in the electronic device. The charging parameter that monotonically decreases along the moving direction determined based on the charging parameter includes at least one of the following: a current of the transmitting coil and an input voltage of the inverter circuit.

Preferably, the method further includes: when no data packet sent by the electronic device is received, and the self-inductance of the transmitting coil is greater than a preset threshold, determining that the wireless charging device and the electronic device are in the non-communicable area.

Preferably, the method further includes: obtaining the self-inductance of the transmitting coil based on the resonant frequency of the resonant network and the resonant capacitor of the resonant network.

This embodiment of this disclosure further provides a wireless charging system, where the wireless charging system includes the wireless charging device introduced above and further includes an electronic device. The electronic device includes a receiving coil and a rectifier circuit. The wireless charging device is configured to perform wireless charging on the electronic device. The electronic device may be a mobile phone, a wearable device, or the like.

This embodiment of this disclosure further provides a wireless charging base, for example, to perform wireless charging on a mobile phone or a wearable device. The wearable device is, for example, a Bluetooth headset or a telephone watch. The wireless charging base includes a power interface, a resonant network, an inverter circuit, a controller, a transmitting coil chassis, and an alignment guide rail. The power interface is configured to connect a direct current transmitted by an adapter. The resonant network includes a resonant capacitor and a transmitting coil. The transmitting coil chassis is configured to place the transmitting coil. An input end of the inverter circuit is configured to connect to the power interface, and an output end of the inverter circuit is configured to connect to the resonant network. The controller is configured to determine a moving direction of the transmitting coil based on a self-inductance of the transmitting coil or a resonant frequency of the resonant network, and control, based on the moving direction of the transmitting coil, the transmitting coil chassis to move on the alignment guide rail, to enable the wireless charging device to align with the electronic device. The self-inductance of the transmitting coil increases along the moving direction of the transmitting coil, and the resonant frequency decreases along the moving direction of the transmitting coil.

The wireless charging base provided in this embodiment can determine the moving direction based on the self-inductance of the transmitting coil or the resonant frequency of the resonant network, and then control the transmitting coil to move along the moving direction, so that the self-inductance of the transmitting coil increases along the moving direction, and the resonant frequency decreases along the moving direction. In this way, the transmitting coil aligns with the receiving coil. The wireless charging base can automatically control a movement of the transmitting coil to implement alignment with a receiving coil in an electronic device having a wireless charging function, for example, a mobile phone. Therefore, a degree of freedom of wireless charging on the electronic device is increased, a requirement for a user on accuracy of placing a mobile phone is reduced, and user experience is improved.

Preferably, the alignment guide rail includes at least a first guide rail and a second guide rail whose projections on a horizontal plane are perpendicular to each other, and further includes an electric drive member. The electric drive member is configured to drive the transmitting coil to move along the first guide rail and the second guide rail. The controller is configured to control the electric drive member, so that the transmitting coil moves along the moving direction.

An implementation form of the electric drive member is not specifically limited in this embodiment of this disclosure. For example, the electric drive member may be a motor. The motor is powered, and the controller controls a rotation direction and a rotation speed of the motor. For example, two motors may be included: a first motor and a second motor. The first motor drives the transmitting coil to move along the first guide rail, and the second motor drives the transmitting coil to move along the second guide rail.

Preferably, a specific form of the charging base is not specifically limited in this embodiment of this disclosure. For example, to increase aesthetics and save materials and space, the wireless charging base may be disk-shaped, and correspondingly, the transmitting coil is disk-shaped.

Compared with a conventional technology, the technical solution provided in the embodiments of this disclosure has the following advantages.

The position deviation between the transmitting coil and the receiving coil has the monotonic relationship with the self-inductance of the transmitting coil. To be specific, the larger the position deviation, the smaller the self-inductance of the transmitting coil. The position deviation between the transmitting coil and the receiving coil has the monotonic relationship with the resonant frequency of the resonant network. To be specific, the larger the position deviation, the larger the resonant frequency. Therefore, position alignment of the transmitting coil may be implemented based on the self-inductance of the transmitting coil or the resonant frequency. In other words, the moving direction for the position alignment may be found based on the self-inductance of the transmitting coil or the resonant frequency, and the controller controls the transmitting coil to move along the moving direction, so that the position deviation between the transmitting coil and the receiving coil gradually becomes small.

In the wireless charging device provided in this embodiment, a coil matrix does not need to be added. Therefore, no extra loss is caused, and accuracy of foreign matter detection is not affected. The wireless charging device relies only on the controller to implement automatic alignment of the transmitting coil, and adjust relative positions of the transmitting coil and the receiving coil, to prepare for wireless charging. Because the wireless charging device can implement automatic alignment, a degree of freedom for the wireless charging device to perform wireless charging on the electronic device may be improved, and user experience may be improved.

BRIEF DESCRIPTION OF DRAWINGS

FIG. 15 is a flowchart of another alignment method according to an embodiment of this disclosure;

DESCRIPTION OF EMBODIMENTS

The terms such as "first" and "second" in the following description are merely intended for a purpose of description, and shall not be understood as an indication or implication of relative importance or implicit indication of a quantity of indicated technical features. Therefore, a feature limited by "first" or "second" may explicitly or implicitly include one or more features. In the description of this disclosure, unless otherwise stated, "a plurality of" means two or more than two.

In addition, in this disclosure, orientation terms such as "upper" and "lower" may include but are not limited to being defined relative to placement orientations of components shown in the accompanying drawings. It should be understood that these orientation terms may be relative concepts and are used for relative descriptions and clarifications, and may vary accordingly based on changes of the placement orientations of the components in the accompanying drawings.

In this disclosure, unless otherwise expressly specified and limited, the term "connection" should be understood in a broad sense. For example, a "connection" may be a fixed connection, a detachable connection or an integral connection; and may be a direct connection or an indirect connection by using an intermediate medium. In addition, the term "coupling" may be a manner of implementing an electrical connection for signal transmission. The "coupling" may be a direct electrical connection, or may be an indirect electrical connection by using an intermediate medium.

A type of an electronic device is not specifically limited in this embodiment of this disclosure. The electronic device may be a device with a wireless charging function, for example, a mobile phone, a pad, a computer with a wireless transceiver function, an intelligent wearable product (for example, a smart watch, a smart band, or a headset), a virtual reality (VR) terminal device, or an augmented reality (AR) terminal device. The electronic device may also be an electronic product, for example, a wireless charging electric vehicle, a wireless charging home appliance (for example, a soymilk machine, or a floor sweeping robot), or a drone.

To make a person skilled in the art better understand the technical solution provided in the embodiments of this disclosure, the following first describes an application scenario of wireless charging of an electronic device. An example in which the electronic device is a mobile phone is used for description.

Figure 1:
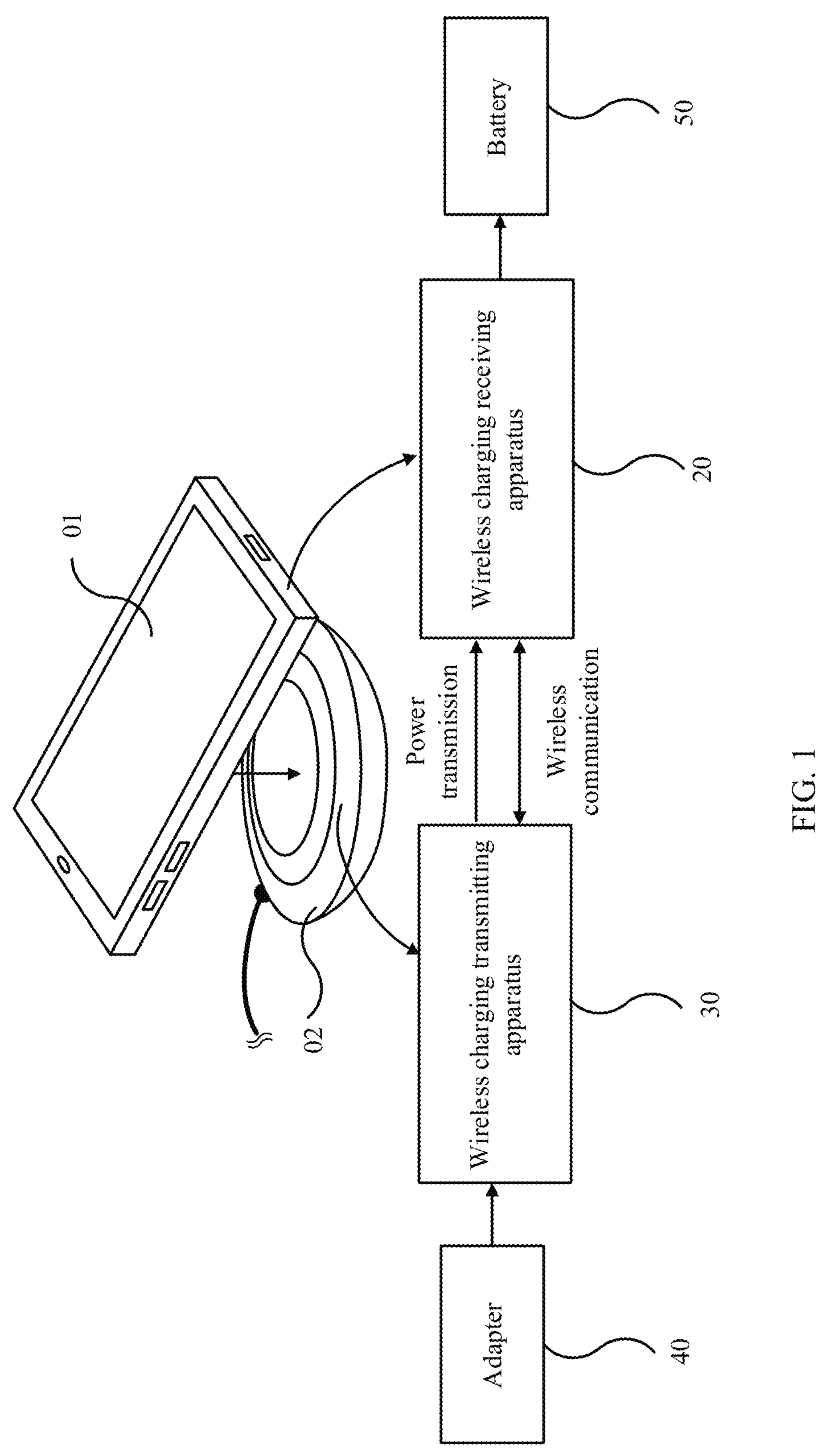
FIG. 1 is a schematic diagram of a wireless charging system according to an embodiment of this disclosure.

Refer to FIG. 1. FIG. 1 is a schematic diagram of a wireless charging system according to an embodiment of this disclosure.

When the electronic device is a mobile phone, a wireless charging device is a wireless charger 02, and the wireless charger 02 is configured to perform wireless charging on an electronic device 01 (namely, the mobile phone). The wireless charger 02 shown in the figure allows the electronic device 01 to be horizontally placed above the wireless charger 02. In some embodiments, the wireless charger 02 may also have another form, for example, a vertical wireless charger that has a specific inclination, so that the electronic device 01 may lean against the wireless charger 02.

The wireless charging system includes a wireless charging receiving (RX) apparatus 20 disposed in the electronic device 01, and a battery 50 coupled to the wireless charging receiving apparatus 20.

The wireless charging system further includes a wireless charging transmitting (TX) apparatus 30 disposed in the wireless charger 02, and an adapter 40 coupled to the wireless charging transmitting apparatus 30, where the adapter 40 is configured to provide charging electric energy.

The wireless charging transmitting apparatus 30 transmits power to the wireless charging receiving apparatus 20. A control signal or charging data may be transmitted between the wireless charging transmitting apparatus 30 and the wireless charging receiving apparatus 20. Transmission of the control signal or transmission of the charging data may be implemented through in-band communication, or may be implemented through out-of-band communication. A wireless connection between the wireless charging transmitting apparatus 30 and the wireless charging receiving apparatus 20 is implemented in an out-of-band communication manner, for example, Bluetooth, wireless fidelity (Wi-Fi), a Zigbee protocol, a radio frequency identification (RFID) technology, a long range (Lora) wireless technology, or a near field communication (NFC) technology, so that wireless communication may be established between the wireless charging transmitting apparatus 30 and the wireless charging receiving apparatus 20.

The charging data may be used to indicate a charging type. In some embodiments, the charging data may be a charging protocol, for example, a wireless charging standard Qi that is launched by the Wireless Power Consortium (WPC), for example, a Basic Power Profile (BPP) protocol, or an Extended Power Profile (EPP) protocol.

Figure 2:
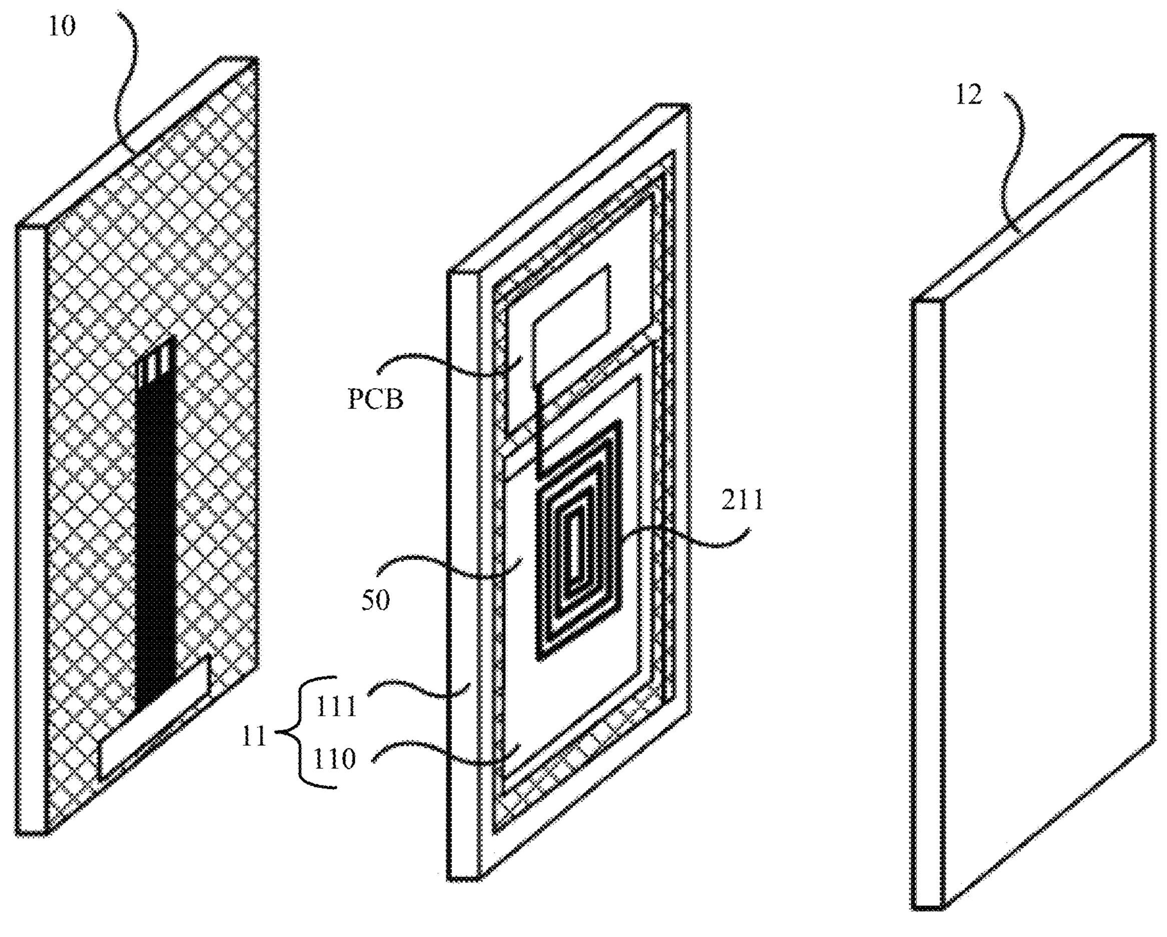
FIG. 2 is a schematic diagram of a structure of the electronic device in FIG. 1.

Refer to FIG. 2. FIG. 2 is a schematic diagram of a structure of the electronic device in FIG. 1.

For example, the electronic device 01 is a mobile phone, and the electronic device 01 mainly includes a display panel (DP) 10. The display panel 10 may be a liquid crystal display (LCD) screen, an organic light emitting diode (OLED) display panel, or the like. When the mobile phone uses a folded-screen architecture or a multi-screen architecture, the mobile phone may alternatively include a plurality of screens. The plurality of screens may alternatively be a combination of the foregoing different types of screens. This is not limited in this disclosure.

The electronic device 01 may further include a middle frame 11 and a housing 12. The display panel 10 and the housing 12 are respectively located on two sides of the middle frame 11, a back surface of the display panel 10 faces the housing 12, and the display panel 10 and the housing 12 are connected by using the middle frame 11. The middle frame 11 includes a bearing plate 110 and a bezel 111 that surrounds the bearing plate 110. The electronic device 01 may further include a printed circuit board (PCB).

A working principle of wireless charging is described below with reference to the accompanying drawing.

Figure 3:
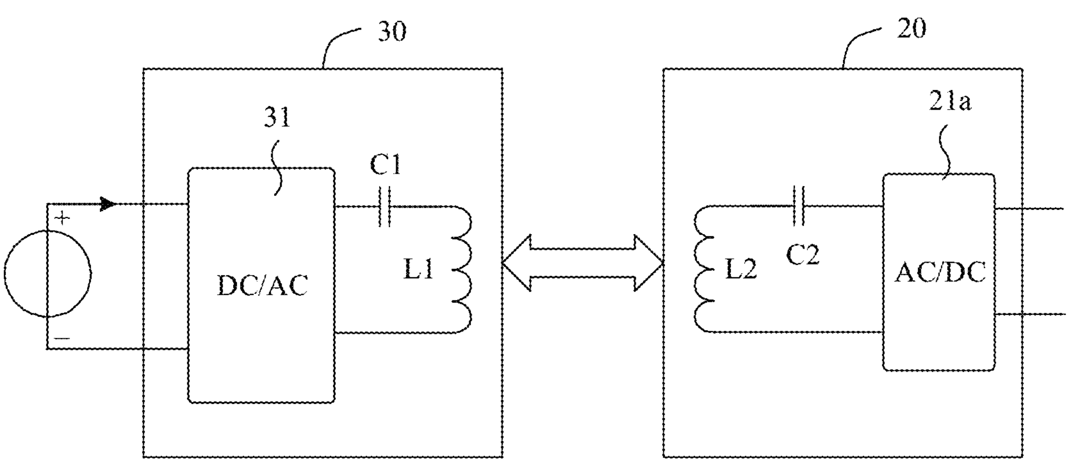
FIG. 3 is a circuit schematic diagram of a wireless charging system according to an embodiment of this disclosure.

Refer to FIG. 3. FIG. 3 is a circuit schematic diagram of a wireless charging system according to an embodiment of this disclosure.

The wireless charging transmitting apparatus 30 is configured to transmit magnetic field energy. The wireless charging transmitting apparatus 30 may be located in the wireless charging device.

The wireless charging transmitting apparatus 30 includes an inverter circuit DC/AC 31. An input end of the inverter circuit DC/AC 31 is configured to connect a direct current power supply, for example, connect to a direct current output by an adapter, and an output end of the inverter circuit DC/AC 31 is connected to a resonant network. The resonant network includes a resonant capacitor C1 and a transmitting coil L1. In this embodiment of this disclosure, an example in which the resonant capacitor C1 and the transmitting coil L1 form series resonance is used.

The wireless charging receiving apparatus 20 is configured to receive magnetic field energy transmitted by the wireless charging transmitting apparatus 30. The wireless charging receiving apparatus 20 may be located in the electronic device.

The wireless charging standard Qi recommends that the control signal and the charging data are transmitted through in-band communication. To be specific, the control signal is carried on wireless power transmission. Therefore, the prerequisite for transmitting the control signal is that the alternating magnetic field generated by a current of the transmitting coil can establish a sufficient induced voltage on the receiving coil to form power transmission. In the Qi protocol, after the wireless charging transmitting apparatus 30 recognizes a signal strength packet returned by the wireless charging receiving apparatus 20 in a ping phase, communication between the wireless charging transmitting apparatus 30 and the wireless charging receiving apparatus 20 is successfully established.

When wireless charging is performed between the wireless charging device and the electronic device, the Qi protocol of wireless charging is applicable. The Qi protocol specifies that the phases of wireless charging include: a ping phase, an identification and configuration phase, and an electric energy transmission phase.

When the wireless charging device and the electronic device enter the ping phase, it indicates that the wireless charging device and the electronic device are located in a communicable area, namely, an area where a ping signal can be transmitted and power can be received. When the wireless charging device and the electronic device are located in a non-communicable area, the wireless charging device and the electronic device do not enter an area where a ping signal can be transmitted and power can be received. In other words, the wireless charging device and the electronic device enter an area where a ping signal can be transmitted but power cannot be received, an area where power cannot be transmitted, or an area where a signal strength packet detection cannot be performed.

In the following embodiments, for ease of description, the area where the ping signal can be transmitted and power can be received corresponds to the communicable area, and the area where the ping signal can be transmitted but power cannot be received corresponds to the non-communicable area.

The wireless charging receiving apparatus 20 includes a receiving coil L2, a capacitor C2, and a rectifier circuit AC/DC 21*a*. The rectifier circuit AC/DC 21*a* converts an alternating current output by the receiving coil L2 into a direct current for charging the battery.

After converting input electric energy into the magnetic field energy, the wireless charging device emits the magnetic field energy by using the wireless charging transmitting apparatus 30. When the electronic device is located near the wireless charging device, the electronic device receives, by using the wireless charging receiving apparatus 20, the magnetic field energy emitted by the wireless charging device, and converts the magnetic field energy into electric energy, to charge the electronic device. In this way, wireless transmission of the electric energy from the wireless charging device to the electronic device is implemented.

When the wireless charging device and the electronic device communicate with each other through in-band communication, the communicable area and the non-communicable area are included. When a charged electronic device is a mobile phone or a wearable device, for example, the communicable area generally indicates that a plane position deviation between the transmitting coil and the receiving coil is within 10 mm. For example, when the transmitting coil is disk-shaped, the receiving coil is disk-shaped, and the wireless charging device is laid flat, a plane on which the transmitting coil is located is parallel to a horizontal plane. When the mobile phone is laid flat on the wireless charging device, a plane on which the receiving coil is located is almost parallel to the plane on which the transmitting coil is located. Because both the transmitting coil and the receiving coil are disk-shaped, a plane position deviation between the transmitting coil and the receiving coil refers to a plane deviation between a center of the transmitting coil and a center of the receiving coil.

When the plane position deviation between the transmitting coil and the receiving coil is large, for example, greater than 10 mm, the two coils cannot communicate. For example, the wireless charging device fails to receive a data packet sent by the mobile phone. When the wireless charging device cannot receive the data packet sent by the electronic device, the wireless charging device cannot perform closed-loop control to implement wireless charging. In other words, power transmission cannot be implemented. When the transmitting coil and the receiving coil are in the non-communicable area, the wireless charging device cannot control a movement of the transmitting coil based on a current of the transmitting coil, an input voltage of the inverter circuit, an output voltage of the rectifier circuit, charging efficiency, or a charging frequency, to implement position alignment.

When the wireless charging device and electronic device are in the non-communicable area, the self-inductance of the transmitting coil has a monotonic relationship with a horizontal position. Therefore, to resolve the alignment in the non-communicable area, the monotonic relationship between the self-inductance of the transmitting coil and the horizontal position may be used to control the movement of the transmitting coil. In this way, the position deviation between the transmitting coil and the receiving coil is reduced, and the two coils enter the communicable area. A necessary condition for communication between the wireless charging device and the electronic device is that the induced voltage of the electronic device needs to reach a specific intensity. In addition, because the self-inductance of the transmitting coil has the monotonic relationship with the position deviation, the self-inductance of the transmitting coil can also be used to implement the alignment between the transmitting coil and the receiving coil in the communicable area. In other words, the self-inductance of the transmitting coil can be used to implement the alignment between the transmitting coil and the receiving coil not only in the communicable area but also in the non-communicable area.

Embodiment 1 of a Wireless Charging Device

Figure 4:
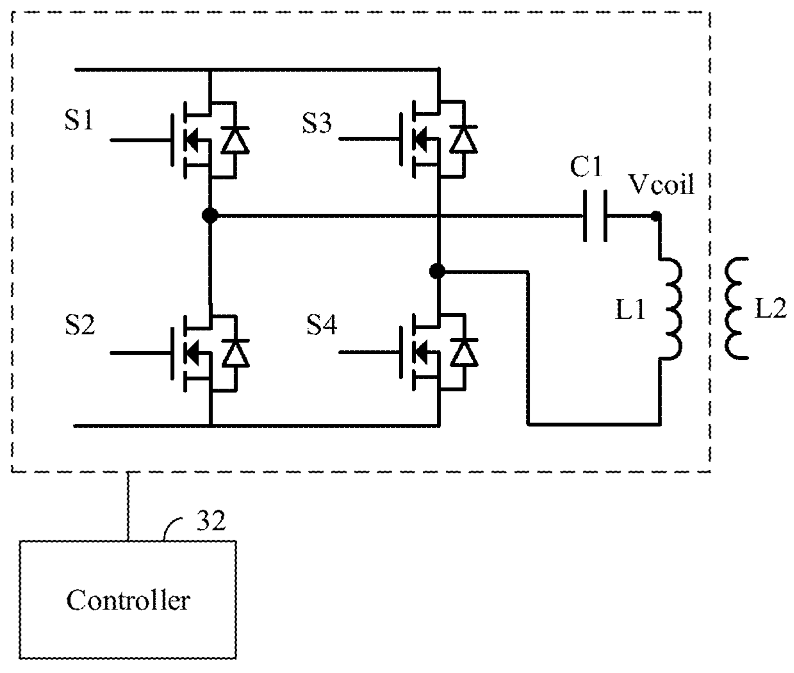
FIG. 4 is a schematic diagram of a wireless charging device according to an embodiment of this disclosure.

With reference to FIG. 4, the following describes a working principle of performing automatic alignment by a wireless charging device provided in this embodiment of this disclosure.

Refer to FIG. 4. FIG. 4 is a schematic diagram of a wireless charging device according to an embodiment of this disclosure.

The wireless charging device provided in this embodiment is configured to perform wireless charging on an electronic device, and includes a resonant network, an inverter circuit, and a controller.

The resonant network includes a resonant capacitor and a transmitting coil.

An input end of the inverter circuit is configured to connect to a direct current power supply, and an output end of the inverter circuit is configured to connect to the resonant network.

In this embodiment, an example in which the inverter circuit is a full bridge circuit is used for description. The inverter circuit includes four controllable switching transistors: S1 to S4.

The controller 32 is configured to determine a moving direction of the transmitting coil based on a self-inductance L1 of the transmitting coil or a resonant frequency of the resonant network, and control a movement of the transmitting coil based on the moving direction, to enable the wireless charging device to align with the electronic device. The self-inductance L1 of the transmitting coil increases along the moving direction of the transmitting coil, and the resonant frequency decreases along the moving direction of the transmitting coil.

A position deviation between the transmitting coil and a receiving coil has a monotonic relationship with the self-inductance L1 of the transmitting coil. The position deviation between the transmitting coil and the receiving coil also has a monotonic relationship with the resonant frequency of the resonant network.

Because the self-inductance L1 of the transmitting coil is negatively correlated with the position deviation, the smaller the position deviation, the larger the self-inductance L1 of the transmitting coil. Therefore, the moving direction of the transmitting coil may be determined based on a change trend of L1. To be specific, the transmitting coil should be moved toward a direction at which L1 increases, so that position alignment between the transmitting coil and the receiving coil can be implemented.

Figure 5A:
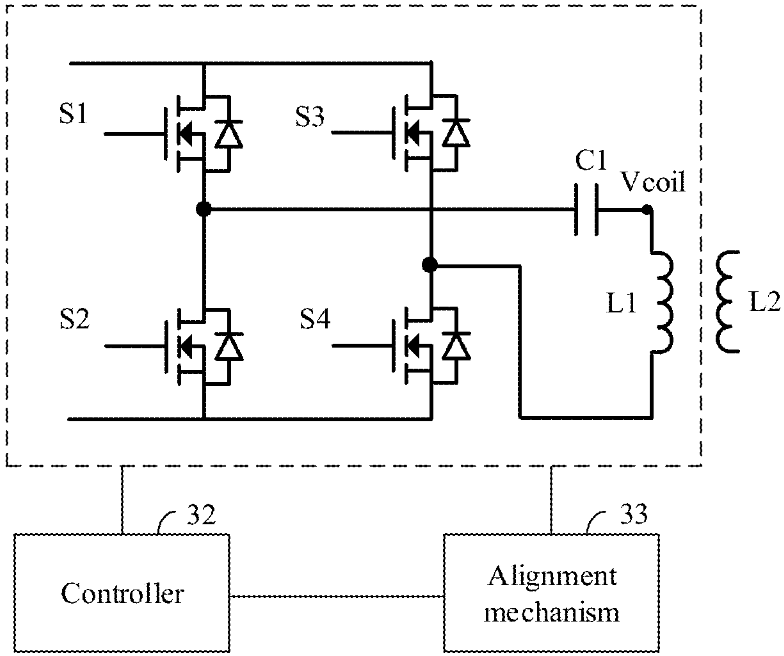
FIG. 5A is a schematic diagram of another wireless charging device according to an embodiment of this disclosure.

In an implementation, the wireless charging device may include an alignment mechanism, as shown in FIG. 5A. FIG. 5A is a schematic diagram of another wireless charging device according to an embodiment of this disclosure.

The wireless charging device provided in this embodiment further includes an alignment mechanism 33.

The controller 32 controls, based on the moving direction of the transmitting coil, the alignment mechanism 33 to drive the transmitting coil to move along the moving direction.

An implementation of the alignment mechanism is that the alignment mechanism includes at least a first motor, a second motor, a first guide rail, and a second guide rail.

The first guide rail and the second guide rail are perpendicular to each other.

The first motor is configured to drive the transmitting coil to move along the first guide rail.

The second motor is configured to drive the transmitting coil to move along the second guide rail.

Figure 5B:
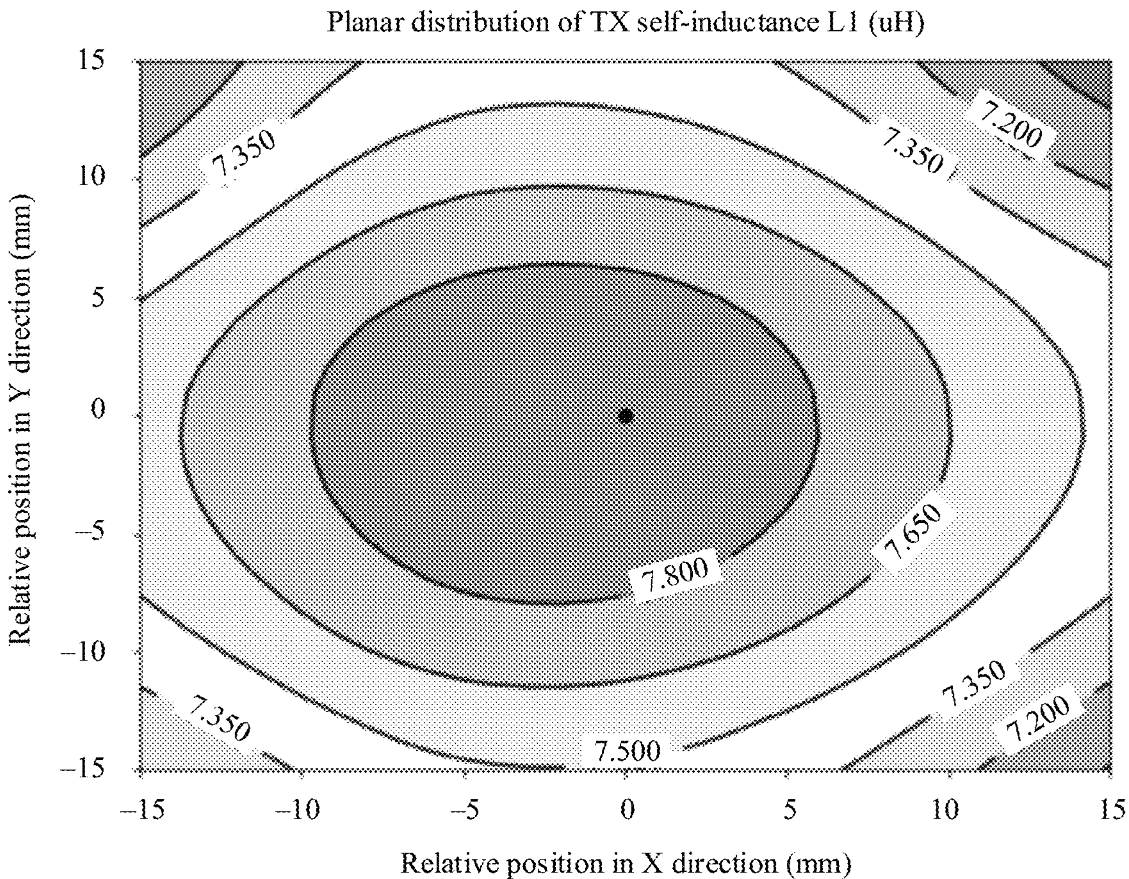
FIG. 5B is a diagram showing a relationship between a self-inductance of a transmitting coil and a deviation according to an embodiment of this disclosure.

The controller is configured to control the first guide rail and the second guide rail, to enable the transmitting coil to move along the moving direction. Refer to FIG. 5B. FIG. 5B is a diagram showing a relationship between a self-inductance of a transmitting coil and a deviation according to an embodiment of this disclosure. In FIG. 5B, X and Y respectively represent two mutually perpendicular directions on a horizontal plane. For example, X represents a horizontal direction, Y represents a direction perpendicular to the horizontal direction, and units are millimeter mm.

When the transmitting coil and the receiving coil are located in the non-communicable area, relative positions of the transmitting coil and the receiving coil can be determined only by using the self-inductance L1 of the transmitting coil.

As shown in FIG. 5B, as relative positions of the wireless charging device and the electronic device change, the self-inductance L1 of the transmitting coil changes accordingly. Generally, the wireless charging device and the electronic device are presented on one horizontal plane, and the self-inductance L1 of the transmitting coil decreases with an increase of a position deviation. For example, when coordinates of X and Y are both 0, a corresponding L1 is 7.8 uH; and when coordinates of X and Y are both 5 mm, a corresponding L1 is 7.65 uH. In other words, a larger position deviation indicates a smaller L1, or L1 is negatively related to the position deviation.

For example, when L1 is used for alignment in the non-communicable area, the transmitting coil may be controlled to move into the communicable area based on L1.

When L1 is used for alignment in the communicable area, the transmitting coil may be controlled to align with the receiving coil based on L1.

It may be understood that the moving direction is not obtained at a time, and a moving track may be determined only after detection on the self-inductance of the transmitting coil is performed at plurality of positions. For example, the moving direction can be determined only after L1 of at least two positions is detected and the magnitude of L1 at the two positions is compared. Finally, the transmitting coil may move into the communicable area.

FIG. 5B merely shows a trend that the self-inductance of the transmitting coil changes with the position deviation between the wireless charging device and the electronic device. In addition to the monotonic relationship between the self-inductance of the transmitting coil and the position deviation, the resonant frequency of the resonant network may be used to perform alignment. The resonant frequency is positively related to the position deviation. In other words, the larger the position deviation, the larger the resonant frequency. Conversely, the smaller the position deviation, the smaller the resonant frequency.

The following describes a manner of obtaining the resonant frequency and the self-inductance of the transmitting coil with reference to the accompanying drawings.

Figure 6:
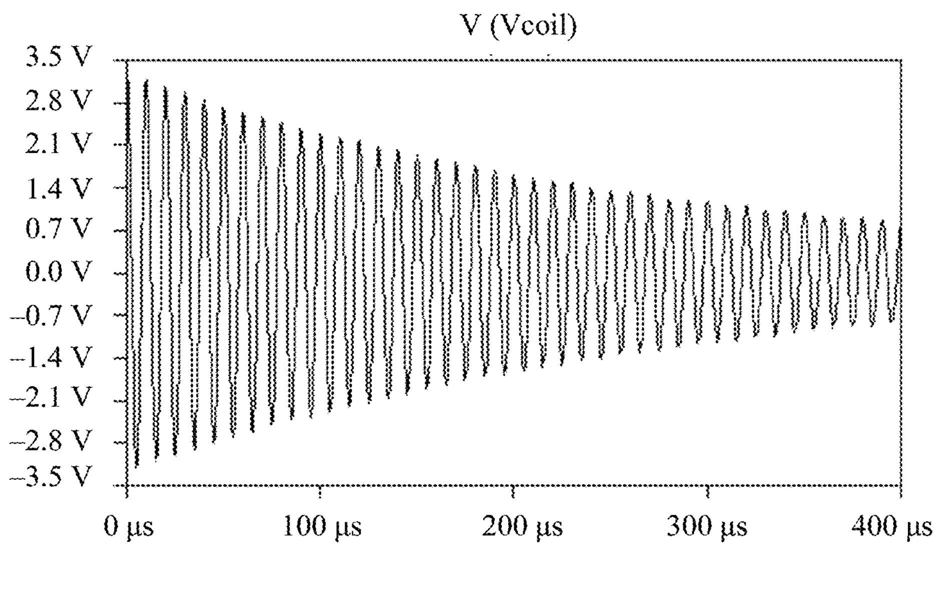
FIG. 6 is a curve diagram showing voltage oscillation of a transmitting coil according to an embodiment of this disclosure.

Refer to FIG. 6. FIG. 6 is a curve diagram showing voltage oscillation of a transmitting coil according to an embodiment of this disclosure.

The detection on the self-inductance of the transmitting coil is mainly implemented by the controller of the wireless charging device.

After being powered on, the wireless charging system enters a resonant parameter detection phase. Still refer to FIG. 5B. A direct current voltage is provided on a direct current bus of the full bridge circuit (S1-S4). At the same time, a first switching transistor S1 and a fourth switching transistor S4 of the full bridge circuit are controlled to turn on, and a second switching transistor S2 and a third switching transistor S3 are controlled to turn off. In this case, and S4 form a path to charge a resonant capacitor C1, and a receiving coil L2 remains disconnected from a load.

When the system reaches a steady state, S1 is turned off, and S2 is turned on. Then, energy stored in the resonant capacitor C1 is discharged on the circuit formed by L1, C1, S2 and S4. When oscillation is attenuated, an oscillation attenuation waveform of a voltage Vcoil at an upper end of the transmitting coil is shown in FIG. 6. A resonant period of the voltage Vcoil between the resonant capacitor C1 and a coil inductance L1 may be obtained from the oscillation attenuation waveform diagram. Because the resonant period and the resonant frequency are reciprocal, the resonant frequency $f_0$ may be obtained from the resonant period. As a value of the resonant capacitor C1 is known, the coil inductance L1 may be obtained according to the following formula:

$$L_1 = \frac{1}{(2\pi f_0)^2 C_1}$$

That the resonant period is obtained from the oscillation attenuation waveform may specifically indicate that the resonant period is obtained through calculation based on a time interval between any two adjacent trough points on the oscillation attenuation curve in the figure.

In this embodiment of this disclosure, an example in which L1 and C1 form series resonance is used for description. When the resonant network is in another connection manner, as long as the resonant frequency can be obtained. A specific implementation form of the resonant network is not specifically limited in this embodiment of this disclosure, and may be another connection form other than LC series.

In the wireless charging device provided in this embodiment of this disclosure, the position deviation between the transmitting coil and the receiving coil has a monotonic relationship with the self-inductance of the transmitting coil, and the position deviation between the transmitting coil and the receiving coil also has a monotonic relationship with the resonant frequency of the resonant network. Therefore, position alignment may be implemented based on the self-inductance of the transmitting coil or the resonant frequency. In other words, the moving direction for the position alignment may be found based on the self-inductance of the transmitting coil or the resonant frequency, and the controller controls the alignment mechanism to drive the transmitting coil to move along the moving direction, so that the position deviation between the transmitting coil and the receiving coil gradually becomes small. In the wireless charging device provided in this embodiment, a coil matrix does not need to be added, and the transmitting coil can enter the communicable area only by relying on the controller and the alignment mechanism, thereby coarsely adjust the relative positions of the transmitting coil and the receiving coil to prepare for wireless charging.

Regardless of whether the wireless charging device provided in this embodiment communicates with the electronic device through Bluetooth or in-band communication, the position alignment may be implemented based on the self-inductance of the transmitting coil or the resonant frequency. For example, when interaction between the wireless charging device and the electronic device is implemented through the in-band communication, the position alignment in the area where the ping signal can be transmitted and power can be received may be implemented only based on the self-inductance of the transmitting coil or the resonant frequency. In the area where the ping signal can be transmitted but power cannot be received, the position alignment may be implemented still based on the self-inductance of the transmitting coil or the resonant frequency, or based on another charging parameter that has a monotonic relationship with the position deviation.

Embodiment 2 of a Wireless Charging Device

Figures 7, 8:
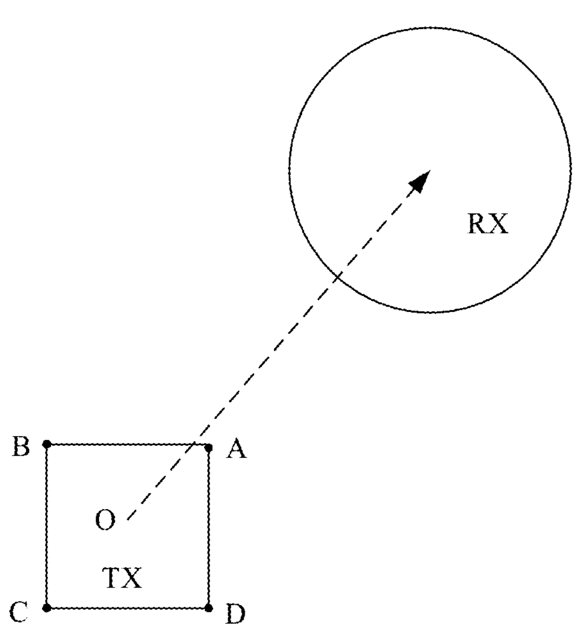
FIG. 7 is a schematic diagram showing a movement of a transmitting coil according to an embodiment of this disclosure.
FIG. 8 is a schematic diagram showing another movement of a transmitting coil according to an embodiment of this disclosure.

Refer to FIG. 7. FIG. 7 is a schematic diagram showing a movement of a transmitting coil according to an embodiment of this disclosure.

The following describes how the controller determines the moving direction of the transmitting coil based on a self-inductance of the transmitting coil or a resonant frequency of a resonant network when the wireless charging device and the electronic device communicate with each other through in-band communication and the transmitting coil is located in at least an area where a ping signal can be transmitted but power cannot be received. In addition, when the transmitting coil is located in an area where a ping signal can be transmitted and power can be received, the moving direction of the transmitting coil may also be determined based on the self-inductance of the transmitting coil or the resonant frequency of the resonant network, to control the transmitting coil to perform alignment.

In the wireless charging device provided in this embodiment of this disclosure, to minimize alignment time and enable the transmitting coil to move into a communicable area as soon as possible, several implementations of determining a moving direction are described below.

First implementation: central measurement method.

For the transmitting coil, a receiving coil may be in any direction around the transmitting coil, that is, in 360 degrees. Therefore, at the beginning, the controller can control an alignment mechanism to drive the transmitting coil to take an initial position as a center. The initial position is a current position of the transmitting coil. If the transmitting coil is disk-shaped, the transmitting coil takes a center of the disk as the initial position to move around the center, to obtain a direction in which the self-inductance of the transmitting coil is the greatest in a moving process of the transmitting coil. The direction in which the self-inductance of the transmitting coil is the greatest is the moving direction.

For ease of understanding, in FIG. 7, an initial position O is used as a central point, and a direction in which the self-inductance is the largest is found around point O. For example, for a square with O as a central point, measurement on the self-inductance of the transmitting coil is separately performed at four vertices of the square. For example, the controller controls the transmitting coil to move to point A, point B, point C, and point D. By detecting four sampling points, it is found that a self-inductance corresponding to point A is the largest. Therefore, the transmitting coil is controlled to move along an OA direction. Because a position of the transmitting coil is finally point D during detection, the transmitting coil is controlled to move from point D to point A first. The transmitting coil is then controlled to move along the OA direction.

FIG. 7 uses four sampling points as examples, and is merely for an illustration purpose in this embodiment of this disclosure. To more accurately determine the moving direction, a greater quantity of sampling points may be set. The following describes how to set sampling points on a circumference of a preset radius by using point O as a center of a circle.

Refer to FIG. 8. FIG. 8 is a schematic diagram showing another movement of a transmitting coil according to an embodiment of this disclosure.

The controller controls the alignment mechanism to drive the transmitting coil to move on a circumference of a preset radius with an initial position as a center, to obtain a direction in which a self-inductance of the transmitting coil is the largest in a process that the transmitting coil moves on the circumference.

It may be understood that, in the moving process of the transmitting coil, more positions to which the transmitting coil moves, for example, a more quantity of points if a point is used to represent a position to which the transmitting coil moves, higher accuracy of finally obtaining the direction in which a self-inductance of the transmitting coil is the largest. However, a more quantity indicates longer time to be consumed.

Therefore, to save time, several sampling points may be evenly obtained around the central point. The transmitting coil is controlled to move to the evenly arranged sampling points, and a self-inductance of the transmitting coil corresponding to each sampling point is obtained. A direction corresponding to the largest self-inductance of the transmitting coil is the direction in which the self-inductance of the transmitting coil is the largest.

For example, six sampling points are evenly selected at 360 degrees around the central point. In other words, one sampling point is selected at an interval of 60 degrees. The transmitting coil is controlled to move to the six sampling points in sequence, to obtain L1 corresponding to each of the six sampling points. For ease of description, A, B, C, D, E, and F represent six sampling points. The transmitting coil moves from A to F in sequence, and point O is used as an initial position. An included angle between AO and FO is 60 degrees. After the six sampling points are traversed, it is learned that a self-inductance of the transmitting coil corresponding to point B is the largest. In this case, a maximum movement direction is direction OB. In other words, OB is the moving direction. When traversing is complete, a position of the transmitting coil is point F. In this case, the transmitting coil moves from point F to point B, and then moves along a straight line direction of OB starting from point B.

It should be noted that, the center of the receiving coil RX shown in FIG. 8 is exactly on the straight line OB. However, during an actual movement, the center of the receiving coil RX generally may not be on the straight line OB due to a quantity of sampling points and a difference in actual positions. In this case, the transmitting coil may move according to a direction determined by OB. While the transmitting coil is moving, a self-inductance at a sampling point around a new position to which the transmitting coil moves is detected, and a new moving direction is determined based on the self-inductance until the transmitting coil moves into the communicable area. Alternatively, the transmitting coil may move along a straight line direction close to a specific angle with OB. While the transmitting coil is moving, a self-inductance at a sampling point around a new position to which the transmitting coil moves is detected, and a new moving direction is determined based on the self-inductance.

A manner of re-determining a moving direction is the same as a manner of determining a moving direction for the first time. Details are not described herein again, and principles are the same.

Figures 9, 10:
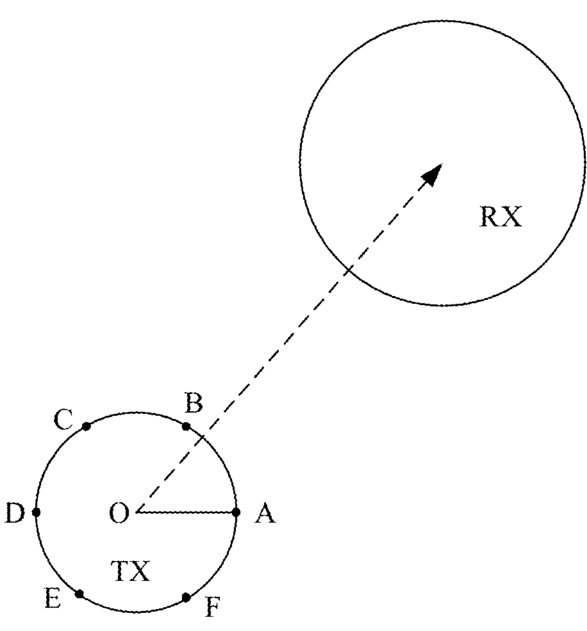
FIG. 9 is a schematic diagram showing still another movement of a transmitting coil according to an embodiment of this disclosure.
FIG. 10 is a schematic diagram showing yet another movement of a transmitting coil according to an embodiment of this disclosure.

As shown in FIG. 9, a central point of the RX is not on the straight line OB. If the transmitting coil is moved along the straight line OB, it may take long time to enter a communicable area. To reduce alignment time, a new moving direction may be determined while the transmitting coil is moving, so that the transmitting coil enters the communicable area as soon as possible.

The foregoing description merely takes the initial position as the central point as an example, as long as the transmitting coil moves around the central point. For example, sampling may not be performed on a side of a square or on a circumference, but sampling may be performed around the central point with a gradually enlarged radius. For example, the moving is in a spiral manner, and the direction in which the self-inductance of the transmitting coil is the largest may be finally determined.

The following describes a manner in which the moving direction may be determined quickly. The moving direction may be determined by detecting self-inductances only at three sampling points. Through gradual iterations, the transmitting coil can be controlled to enter the communicable areas. A condition for triggering each iteration may be that a moving direction needs to be re-determined when a reduction in the self-inductance is detected.

Second implementation: triangular measurement method.

Refer to FIG. 10. FIG. 10 is a schematic diagram showing yet another movement of a transmitting coil according to an embodiment of this disclosure.

The controller controls the alignment structure to drive the transmitting coil to move around a starting point O separately to a first point A and a second point B with an initial position O as the starting point. The starting point O, the first point A, and the second point B form a triangle OAB. The controller determines the moving direction based on a self-inductance of the transmitting coil corresponding to each of the first point A and the second point B.

For example, through detection, a self-inductance of the transmitting coil corresponding to point A is greater than a self-inductance of the transmitting coil corresponding to point B. Therefore, the transmitting coil may be controlled to move in a direction close to OA. As shown in the figure, the transmitting coil may move in direction OC, an included angle between OC and OA is θ, and the included angle between OC and OA is smaller than an included angle between OC and OB.

During a specific movement, a self-inductance corresponding to point A may be detected first. To be specific, the transmitting coil moves from point O to point A and then moves from point A to point B to obtain a self-inductance corresponding to point B, and finally moves from point B to OC, namely, a straight line at a specific angle with OA, and gradually moves along OC. During the moving process, a triangle may be reconstructed and a moving direction may be re-determined based on the measured self-inductance. In other words, through the gradual iterations, the transmitting coil is controlled to finally move into the communicable area.

In this embodiment, the reason why point A and point B are set and OAB is a triangle is that OAB cannot be on a same straight line, and when OAB presents as a triangle, two performance indicators of accuracy of the moving direction and low time consumption are balanced. In this way, the accuracy of the moving direction can be ensured while ensuring that time required for determining the moving direction is short. An angle between OA and OB is not limited in this embodiment of this disclosure, and may be an acute angle, an obtuse angle, or a right angle.

The following describes a case in which the angle between OA and OB is a right angle. To be specific, the triangle OAB may be a common right triangle, or may be an isosceles triangle. This is not specifically limited in this embodiment.

Figure 11:
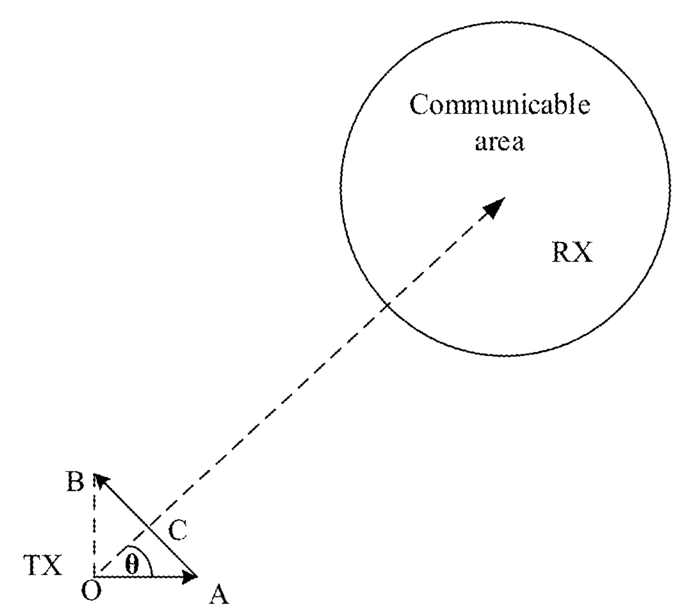
FIG. 11 is a schematic diagram showing still yet another movement of a transmitting coil according to an embodiment of this disclosure.

Refer to FIG. 11. FIG. 11 is a schematic diagram showing still yet another movement of a transmitting coil according to an embodiment of this disclosure.

In this embodiment, an example in which point A, point B, and point O form a right triangle is used. For a right triangle, it can be ensured that the moving direction is determined at a fastest speed when there are fewer sampling points.

The controller controls the alignment mechanism to drive the transmitting coil to move to other two vertices of two right-angled sides with a common vertex of the two right-angled sides of the right triangle as an initial position, and obtains the moving direction based on a self-inductance of the transmitting coil corresponding to each of the other two vertices.

As shown in FIG. 11, the controller controls the alignment mechanism to first drive the transmitting coil to move from point O to point A to obtain a self-inductance corresponding to point A, and then control the transmitting coil to move from point A to point B to obtain a self-inductance corresponding to point B. The angle between OA and OB is 90 degrees, that is, a right angle. The moving direction is determined based on the self-inductances corresponding to point A and point B. To be specific, if the self-inductance corresponding to point A is greater than the self-inductance corresponding to point B, the moving direction is a straight line OC that has a specific included angle θ with OA, and the transmitting coil is controlled to move along the moving direction.

As a trigonometric function of each angle in the right triangle is easy to calculate, it is convenient to use the right triangle to determine the moving direction.

The foregoing embodiment merely describes an example of the moving direction of the transmitting coil. A specific method of controlling the movement of the transmitting coil may include a plurality of implementations. This is not specifically limited in this embodiment. As long as the position deviation decreases accordingly when the self-inductance of the transmitting coil gradually increases, the transmitting coil can be moved into the communicable area.

Embodiment 3 of a Wireless Charging Device

The foregoing embodiment describes implementations of moving the transmitting coil into the communicable area in the alignment process. The following describes a working principle that the controller controls the transmitting coil to align with the receiving coil after the transmitting coil enters the communicable area.

Figure 12:
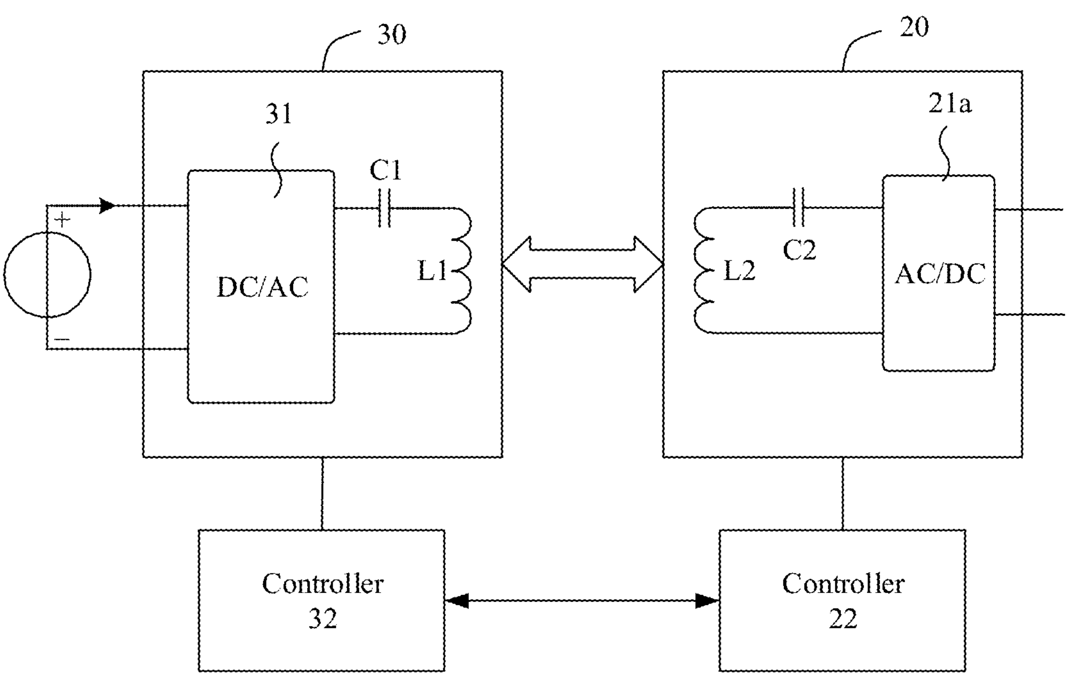
FIG. 12 is a schematic diagram of another wireless charging system according to an embodiment of this disclosure.

Refer to FIG. 12. FIG. 12 is a schematic diagram of another wireless charging system according to an embodiment of this disclosure.

In the wireless charging system, a wireless charging device serves as a transmit end, and an electronic device serves as a receive end.

The wireless charging device provided in this embodiment includes a controller 32, namely, a transmitting controller. The electronic device includes a controller 22, namely, a receiving controller. The controller 32 of the wireless charging device and the controller 22 of the electronic device exchange data with each other in a wireless communication manner.

When the controller 32 of the wireless charging device may receive a data packet sent by the controller 22 of the electronic device, and a self-inductance of the transmitting coil is greater than or equal to a preset threshold, it is determined that the wireless charging device and the electronic device are in the communicable area.

When the transmitting coil moves into the communicable area, a plurality of charging parameters related to charging all have a monotonic relationship with a position deviation. Therefore, the controller can control alignment of the transmitting coil only based on the charging parameters that have the monotonic relationship with the position deviation, thereby finally enabling the transmitting coil to align with the receiving coil.

The controller 32 of the wireless charging device is further configured to: when the wireless charging device and the electronic device are in the communicable area, determine a moving direction of the transmitting coil based on the charging parameters, and control, based on the moving direction, an alignment mechanism to drive the transmitting coil to move until the transmitting coil is in alignment with the receiving coil in the electronic device.

The charging parameters monotonically increase or monotonically decrease as a movement of the moving direction.

When relative positions of the transmitting coil and the receiving coil are close, the controller 22 of the electronic device and the controller 32 of the wireless charging device may communicate with each other. If the transmitting coil enters a power transmission phase, the charging parameter that may be used for alignment include at least one of the following: a current Icoil of the transmitting coil, an input voltage Vbus of a DC/AC 31, an output voltage Vrect of an AC/DC 21*a* in the electronic device, a resonant frequency, and system efficiency. The transmitting coil is controlled to continue to move based on a trend that the parameter changes with the position, until positions of the transmitting coil and the receiving coil are in alignment.

If the transmitting coil does not enter the power transmission phase, the transmitting coil is controlled to continue to move based on a trend that a self-inductance L1 of the transmitting coil changes with the position, to aim for alignment between the transmitting coil and the receiving coil, thereby implementing alignment between the wireless charging device and the electronic device.

When the transmitting coil is located in the communicable area, all the foregoing parameters can be used to judge the relative positions of the transmitting coil and the receiving coil, and the transmitting coil is controlled to move based on a change trend of the foregoing parameters. Based on the foregoing parameters, automatic alignment solutions in the communicable area can be classified into the following four types:

First type: Automatic alignment is performed based on the self-inductance L1 of the transmitting coil or a product of L1 and an alternating current resistance ACR of the transmitting coil.

The alignment solution described in the foregoing embodiment for a case when the transmitting coil is in the non-communicable area is also applicable to alignment in the communicable area. Details are not described herein again. After a center of the transmitting coil is aligned with a center of the receiving coil, the electronic device starts to work, a wireless charging phase is entered, and power transmission starts.

For example, when the transmitting coil moves to a position where L1 is the largest, in other words, L1 no longer becomes larger with the movement of the transmitting coil, it indicates that the center of the transmitting coil is already aligned with the center of the receiving coil.

Alignment of the transmitting coil based on L1 and ACR can be performed both in the communicable area and in the non-communicable area.

When the controller performs alignment based on a charging parameter of a first type, the controller may control the transmitting coil to perform alignment when power transmission is not performed between the wireless charging device and the electronic device. This is because the charging parameter of the first type is only a parameter of the wireless charging device itself. In this case, no charging parameter of the electronic device is required.

The following three types of alignment methods are applicable only to alignment in the communicable area.

Second type: Automatic alignment is performed based on Icoil, Vbus, or a charging frequency.

When the controller of the wireless charging device performs alignment based on charging parameters such as Icoil, Vbus, or the charging frequency, in a power transmission state, only the charging parameters on the wireless charging device side need to be obtained, and a charging parameter required for alignment on the electronic device side does not need to be obtained.

When the transmitting coil is located in the communicable area, the controller 22 of the electronic device controls a charging circuit in the electronic device to start working and enter the power transmission phase, and the controller 32 of the wireless charging device controls the charging frequency to be constant and charges the electronic device by adjusting a voltage, that is, a charging mode of constant-frequency voltage adjustment. In this mode, the input voltage of the DC/AC 31 or the current Icoil of the transmitting coil is detected online to control the movement of the transmitting coil until the center of the transmitting coil is aligned with the center of the receiving coil. It may be understood that, a specific error may exist when the center of the transmitting coil is aligned with the center of the receiving coil, which does not mean that projections of the two centers completely coincide. As long as the error is within a set error range, it is considered that the transmitting coil is already aligned with the receiving coil.

In addition, the controller 32 of the wireless charging device may alternatively control the input voltage to be constant and charge the electronic device by adjusting the charging frequency, that is, a charging mode of constant-voltage frequency adjustment. In this mode, the current Icoil of the transmitting coil or the charging frequency is detected online to control the movement of the transmitting coil until the transmitting coil is aligned with the receiving coil.

In addition, the controller 32 of the wireless charging device may alternatively fix the input voltage of the DC/AC 31 and the charging frequency, and detect the current Icoil of the transmitting coil or the output voltage Vrect of the AC/DC 21*a* in the electronic device online to control the movement of the transmitting coil until the transmitting coil is aligned with the receiving coil.

Third type: Automatic alignment is performed based on the charging efficiency, a mutual inductance between the transmitting coil and the receiving coil, a coupling coefficient between the transmitting coil and the receiving coil, or the output voltage Vrect of the rectifier circuit in the electronic device.

When the controller of the wireless charging device performs alignment based on the charging efficiency, the mutual inductance between the transmitting coil and the receiving coil, the coupling coefficient between the transmitting coil and the receiving coil, or the output voltage of the rectifier circuit in the electronic device, the wireless charging device and the electronic device need to be in a power transmission state. In addition, reference to a part of charging parameters on the electronic device side is needed. To be specific, the electronic device side needs to send the charging parameters to the wireless charging device. In other words, when the wireless charging device performs alignment based on a charging parameter of a third type, the transmitting coil needs to be located in the communicable area and power transmission needs to be performed between the transmit end and the receive end.

The input voltage of the DC/AC 31 is a direct current bus voltage of the DC/AC 31. The output voltage Vrect of the AC/DC 21*a* is a direct current voltage obtained after the AC/DC 21*a* is rectified.

Fourth type: An auxiliary coil in the electronic device is used.

When an auxiliary coil is disposed in the electronic device, the transmitting coil may be controlled to perform alignment by using a parameter related to the auxiliary coil.

Figure 13:
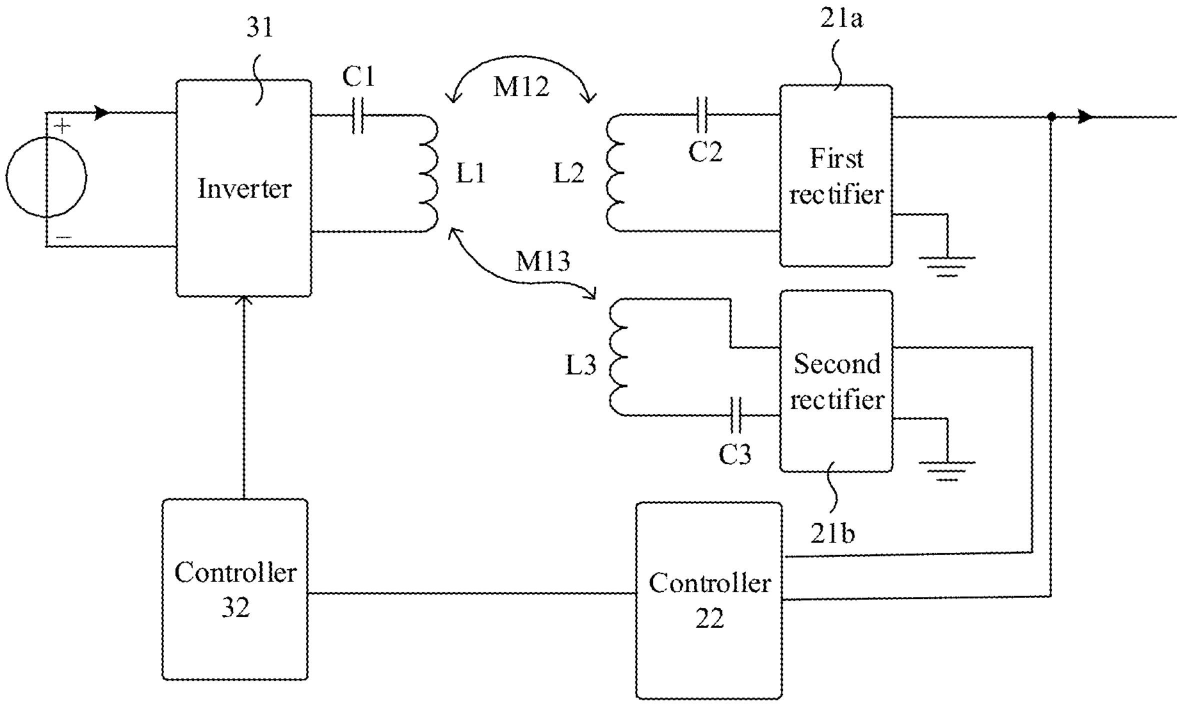
FIG. 13 is a schematic diagram of still another wireless charging system according to an embodiment of this disclosure.

Refer to FIG. 13. FIG. 13 is a schematic diagram of still another wireless charging system according to an embodiment of this disclosure.

The electronic device includes a receiving coil L2, an auxiliary coil L3, a first rectifier 21*a*, and a second rectifier 21*b*. A first end of L2 is connected to a positive input end of the first rectifier 21*a* through C2, and a second end of L2 is connected to a negative input end of the first rectifier 21*a*. An output end of the first rectifier 21*a* is configured to connect to a next charging circuit, and the next charging circuit is configured to charge a battery in the electronic device. In essence, L2 and C2 are connected in series to the input end of the first rectifier 21*a*.

The auxiliary coil L3 and a capacitor C3 are connected in series to an input end of the second rectifier 21*b*.

A mutual inductance between L1 and L2 is M12, and a mutual inductance between L1 and L3 is M13. In this embodiment, both M12 and M13 can be used to control the movement of the transmitting coil, to enable the transmitting coil to align with the receiving coil.

When the transmitting coil enters the communicable area, the controller 22 of the electronic device controls the charging circuit (including the AC/DC 21*a* and the like) to start working, enters the power transmission phase, detects an open-circuit voltage of the auxiliary coil, a mutual inductance between the transmitting coil and the auxiliary coil, or a coupling coefficient between the transmitting coil and the auxiliary coil online, and may control, based on any one of the foregoing parameters, the transmitting coil to move until the center of the transmitting coil is aligned with the center of the receiving coil.

Both the mutual inductance and the coupling coefficient between the transmitting coil and the auxiliary coil are negatively related to the position deviation. To be specific, a smaller position deviation indicates a larger mutual inductance and a larger coupling coefficient between the transmitting coil and the auxiliary coil.

Control on the transmitting coil in the non-communicable area belongs to a coarse adjustment phase of alignment. When the transmitting coil enters the communicable area, the transmitting coil is controlled to move to align with the receiving coil. This belongs to a fine adjustment phase of the transmitting coil. By using the control in the fine adjustment phase provided in this embodiment and the control in the coarse adjustment phase provided in the foregoing embodiment, the transmitting coil is finally aligned with the receiving coil, thereby preparing for wireless charging.

In the foregoing four alignment manners, there is a monotonous change relationship between the charging parameter and the moving direction, which is specifically described below.

A charging parameter that increases with the movement along the moving direction determined based on the charging parameter includes at least one of the following:

the self-inductance of the transmitting coil, the charging frequency, charging efficiency, the output voltage of the rectifier circuit in the electronic device, the product of the self-inductance of the transmitting coil and the alternating current resistance of the transmitting coil, the mutual inductance between the transmitting coil and the receiving coil, the coupling coefficient between the transmitting coil and the receiving coil, the mutual inductance between the transmitting coil and the auxiliary coil, the coupling coefficient between the transmitting coil and the auxiliary coil, and the open-circuit voltage of the auxiliary coil in the electronic device.

The charging parameter that monotonically decreases with the movement along the moving direction includes at least one of the following:

a current of the transmitting coil and an input voltage of the inverter circuit.

In the wireless charging device provided in this embodiment of this disclosure, when the wireless charging device and the electronic device are in the area where the ping signal can be transmitted and power can be received, the moving direction of the transmitting coil can be determined only based on the self-inductance of the transmitting coil or the resonant frequency of the resonant network. When the wireless charging device and the electronic device are in the area where the ping signal can be transmitted and power can be received, the moving direction may still be determined based on the self-inductance of the transmitting coil or the resonant frequency of the resonant network. In addition, when the wireless charging device and the electronic device are in the area where the ping signal can be transmitted and power can be received, in other words, when the wireless charging device and the electronic device are in the communicable area, charging parameters can be exchanged between the wireless charging device and the electronic device. Therefore, the wireless charging device can control the movement of the transmitting coil by using a charging parameter that has a monotonic relationship with the moving direction. The monotonic relationship includes a monotonically increasing relationship and a monotonically decreasing relationship. For example, some charging parameters monotonically increase with the movement of the transmitting coil, and some charging parameters monotonically decrease with the movement of the transmitting coil.

Based on the wireless charging device provided in the foregoing embodiments, this embodiment of this disclosure further provides a wireless charging alignment method. The following describes a working procedure of the wireless charging alignment method in detail with reference to the accompanying drawings.

Method Embodiment 1

Figure 14:
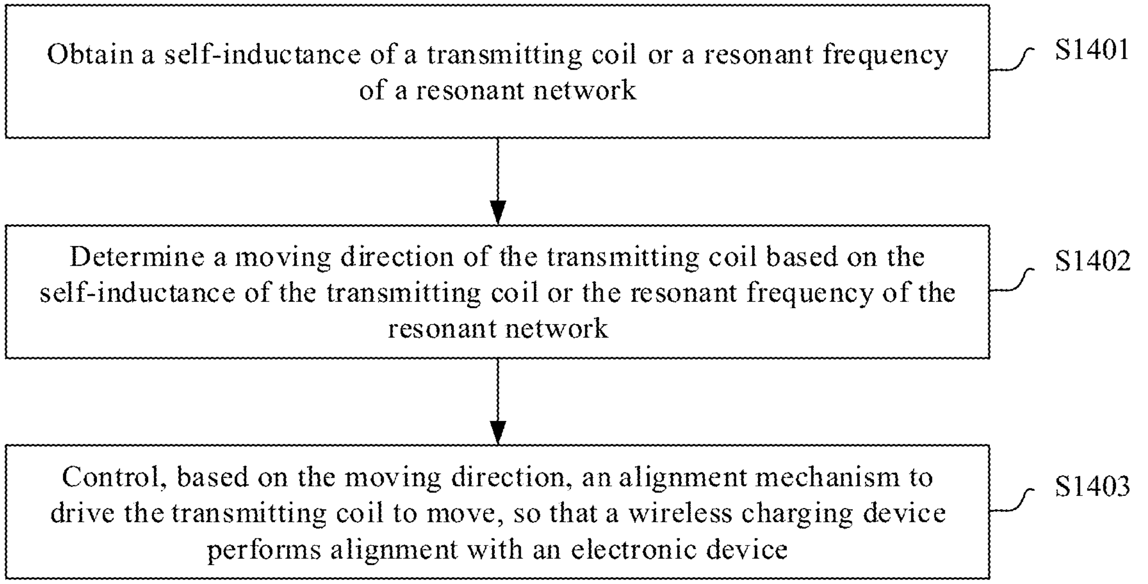
FIG. 14 is a flowchart of an alignment method according to an embodiment of this disclosure.

Refer to FIG. 14. FIG. 14 is a flowchart of embodiment 1 of a wireless charging alignment method according to an embodiment of this disclosure.

The wireless charging alignment method provided in this embodiment is applied to a wireless charging device. The wireless charging device includes a resonant network, an inverter circuit, an alignment mechanism, and a controller. The resonant network includes a resonant capacitor and a transmitting coil. An input end of the inverter circuit is configured to connect to a direct current power supply, and an output end of the inverter circuit is configured to connect to the resonant network.

The method includes the following steps.

S1401: Obtain a self-inductance of the transmitting coil or a resonant frequency of the resonant network.

A specific implementation form of the resonant network is not specifically limited in this embodiment. For example, the self-inductance of the transmitting coil is connected in series with the capacitor in the resonant network to form LC series resonance, or the resonant network may be another form.

When the LC series resonance is used, a resonant frequency of the LC series resonance may be obtained. Alternatively, the resonant frequency may be obtained first, and an inductance is obtained based on the resonant frequency. For a specific obtaining manner, refer to the descriptions of the foregoing device embodiments, and details are not described herein again.

S1402: Determine a moving direction of the transmitting coil based on the self-inductance of the transmitting coil or the resonant frequency of the resonant network.

The self-inductance of the transmitting coil is used as an example. It can be seen from FIG. 5B that the self-inductance of the transmitting coil has a monotonic relationship with X and Y directions of a horizontal plane. Therefore, a movement of the transmitting coil may be controlled based on the monotonic relationship.

The self-inductance of the transmitting coil increases along the moving direction, and the resonant frequency decreases along the moving direction.

When the movement of the transmitting coil is controlled based on the self-inductance of the transmitting coil, the transmitting coil can be moved in a direction in which the self-inductance of transmitting coil increases. When the movement of the transmitting coil is controlled based on the resonant frequency, the transmitting coil can be moved in a direction in which the resonant frequency decreases.

S1403: Control, based on the moving direction, the alignment mechanism to drive the transmitting coil to move, so that the wireless charging device performs alignment with an electronic device.

In the alignment method provided in this embodiment of this disclosure, a position deviation between the transmitting coil and a receiving coil has a monotonic relationship with the self-inductance of the transmitting coil, and the position deviation between the transmitting coil and the receiving coil also has a monotonic relationship with the resonant frequency of the resonant network. Therefore, position alignment may be implemented based on the self-inductance of the transmitting coil or the resonant frequency. In other words, the moving direction for the position alignment may be found based on the self-inductance of the transmitting coil or the resonant frequency, and the controller controls the alignment mechanism to drive the transmitting coil to move according to the moving direction, so that the position deviation between the transmitting coil and the receiving coil gradually becomes small. In the wireless charging device provided in this embodiment, a coil matrix does not need to be added, and the transmitting coil can enter the communicable area only by relying on the controller and the alignment mechanism, thereby coarsely adjust the relative positions of the transmitting coil and the receiving coil to prepare for wireless charging.

In the alignment method provided in this embodiment, regardless of whether communication with the electronic device is implemented through Bluetooth or in-band communication, the position alignment may be implemented based on the self-inductance of the transmitting coil or the resonant frequency. For example, when interaction between the wireless charging device and the electronic device is implemented through the in-band communication, the position alignment in an area where a ping signal can be transmitted but power cannot be received may be implemented only based on the self-inductance of the transmitting coil or the resonant frequency. In an area where a ping signal can be transmitted and power can be received, the position alignment may be implemented still based on the self-inductance of the transmitting coil or the resonant frequency, or based on another charging parameter that has a monotonic relationship with the position deviation.

Method Embodiment 2

The following uses an example in which a wireless charging device communicates with an electronic device by using in-band communication. When a transmitting coil is located at least in an area where a ping signal can be transmitted but power cannot be received, the transmitting coil is controlled by a self-inductance of the transmitting coil to perform alignment. When the transmitting coil is located in an area where a ping signal can be transmitted and power can be received, the transmitting coil may also be controlled by the self-inductance of the transmitting coil to perform alignment.

In other words, determining a moving direction of the transmitting coil based on the self-inductance of the transmitting coil or the resonant frequency of the resonant network specifically includes:

- when the wireless charging device is located in the area where the ping signal can be transmitted but power cannot be received or in the area where the ping signal can be transmitted and power can be received, determining the moving direction of the transmitting coil based on the self-inductance of the transmitting coil or the resonant frequency of the resonant network.

Refer to FIG. 15. FIG. 15 is a flowchart of another alignment method according to an embodiment of this disclosure.

This embodiment describes a central measurement method.

For the transmitting coil, a receiving coil may be in any direction around the transmitting coil, that is, in 360 degrees. Therefore, at the beginning, a controller can control an alignment mechanism to drive the transmitting coil to take an initial position as a center. The initial position is a current position of the transmitting coil. If the transmitting coil is disk-shaped, the transmitting coil takes a center of the disk as the initial position to move around the center, to obtain a direction in which the self-inductance of the transmitting coil is the greatest in a moving process of the transmitting coil. The direction in which the self-inductance of the transmitting coil is the greatest is the moving direction.

The alignment method provided by this embodiment includes the following steps.

S1501: Obtain a self-inductance of the transmitting coil.

Determining a moving direction of the transmitting coil based on the self-inductance of the transmitting coil specifically includes:

- controlling the alignment mechanism to drive the transmitting coil to move around a center with an initial position as the center, to obtain a direction in which the self-inductance of the transmitting coil is the greatest in a moving process of the transmitting coil, where the direction in which the self-inductance of the transmitting coil is the greatest is the moving direction.

In the central measurement method, the initial position is used as the center, the transmitting coil is moved around the center to measure a self-inductance of the transmitting coil at different positions, and a next moving direction is determined based on a magnitude of the self-inductance. For a specific implementation process, refer to the description of the central measurement method in the device embodiment, and details are not described herein again.

For example, the transmitting coil may be moved on a circumference with the initial position as the center and a preset radius as a radius. The preset radius is related to a coverage range of alignment. When the coverage range of the alignment is large, the preset radius may be slightly larger. When the coverage range of the alignment is small, the preset radius may be slightly smaller.

Controlling the alignment mechanism to drive the transmitting coil to move around the center with the initial position as the center specifically includes the following steps:

S1502: Control the alignment mechanism to drive the transmitting coil to move on the circumference of the preset radius with the initial position as the center, to obtain a direction in which the self-inductance of the transmitting coil is the largest in the moving process. The direction in which the self-inductance of the transmitting coil is the greatest is the moving direction.

S1503: Control, based on the direction in which the self-inductance of the transmitting coil is the greatest, the alignment mechanism to drive the transmitting coil to move, to enable the transmitting coil to align with the receiving coil.

According to the method provided in this embodiment, to shorten alignment time, self-inductances corresponding to positions at a limited quantity of sampling points may be selected. For example, when the transmitting coil moves around an initial position, distances between the sampling points and the initial position may be equal. For example, a sampling point is a vertex of a square, and the initial position is a central point of the square. In addition, the sampling points may alternatively be selected on a circumference with an initial position as a center. In addition, distances between the sampling points and the initial position may alternatively be different, and some sampling points may be randomly selected around the initial position.

Method Embodiment 3

The foregoing embodiment describes how to use a central measurement method to control a movement of a transmitting coil. The following describes a manner in which a moving direction can be determined quickly. The moving direction can be determined by detecting self-inductances of the transmitting coil corresponding to only three sampling points, and then iterations are gradually performed in the same manner, to control the transmitting coil to enter a communicable area. A condition for triggering each iteration may be that a moving direction needs to be re-determined when a reduction in the self-inductance of the transmitting coil is detected.

The following describes how to control the movement of the transmitting coil based on a triangular measurement method. A triangle may be a common right triangle, an isosceles triangle, an equilateral triangle, or the like. This is not specifically limited in this embodiment.

Figure 16:
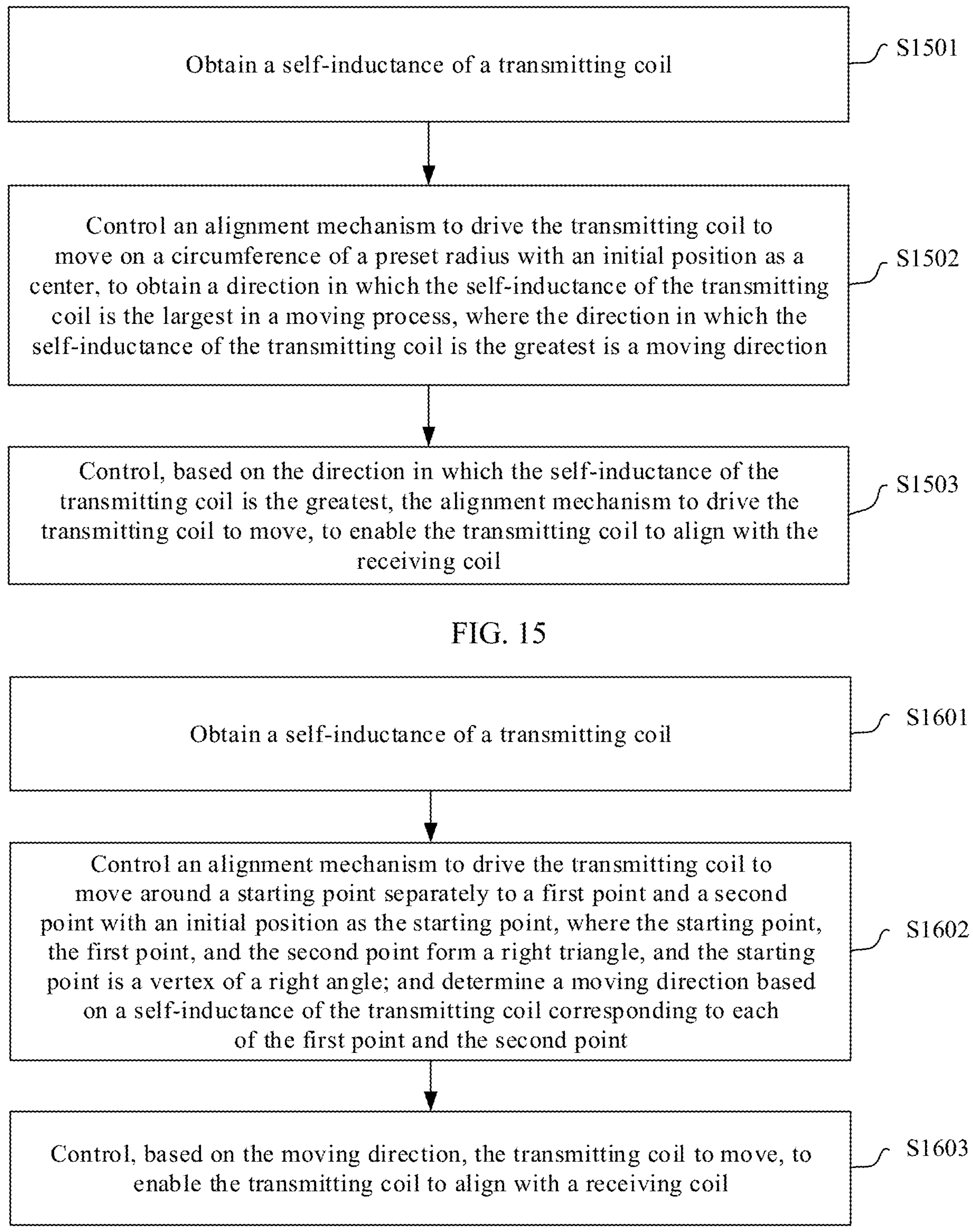
FIG. 16 is a flowchart of still another alignment method according to an embodiment of this disclosure.

Refer to FIG. 16. FIG. 16 is a flowchart of still another alignment method according to an embodiment of this disclosure.

S1601: Obtain a self-inductance of the transmitting coil.

Determining a moving direction of the transmitting coil based on the self-inductance of the transmitting coil specifically includes:

controlling an alignment mechanism to drive the transmitting coil to move around a starting point separately to a first point and a second point with an initial position as the starting point, where the starting point, the first point, and the second point form a triangle; and determining the moving direction based on a self-inductance of the transmitting coil corresponding to each of the first point and the second point.

The starting point is a common vertex of two right-angled sides of the right triangle, and the first point and the second point are other two vertices of the two right-angled sides respectively.

S1602: Control the alignment mechanism to drive the transmitting coil to move around the starting point separately to the first point and the second point with the initial position as the starting point, where the starting point, the first point, and the second point form a right triangle, and the starting point is a vertex of a right angle; and determine the moving direction based on the self-inductance of the transmitting coil corresponding to each of the first point and the second point.

S1603: Control, based on the moving direction, the transmitting coil to move, to enable the transmitting coil to align with the receiving coil.

For a right triangle, it can be ensured that the moving direction is determined at a fastest speed when there are fewer sampling points.

As a trigonometric function of each acute angle in the right triangle is easy to calculate, it is convenient to use the right triangle to determine the moving direction. In addition, the moving direction can be determined quickly by using the right triangle.

The foregoing embodiment merely describes an example of the moving direction of the transmitting coil. A specific method of controlling the movement of the transmitting coil may include a plurality of implementations. This is not specifically limited in this embodiment. As long as the position deviation decreases accordingly when the self-inductance of the transmitting coil gradually increases, the transmitting coil can be moved into the communicable area.

Method Embodiment 4

The following describes a complete implementation of alignment between a transmitting coil and a receiving coil.

Figure 17:
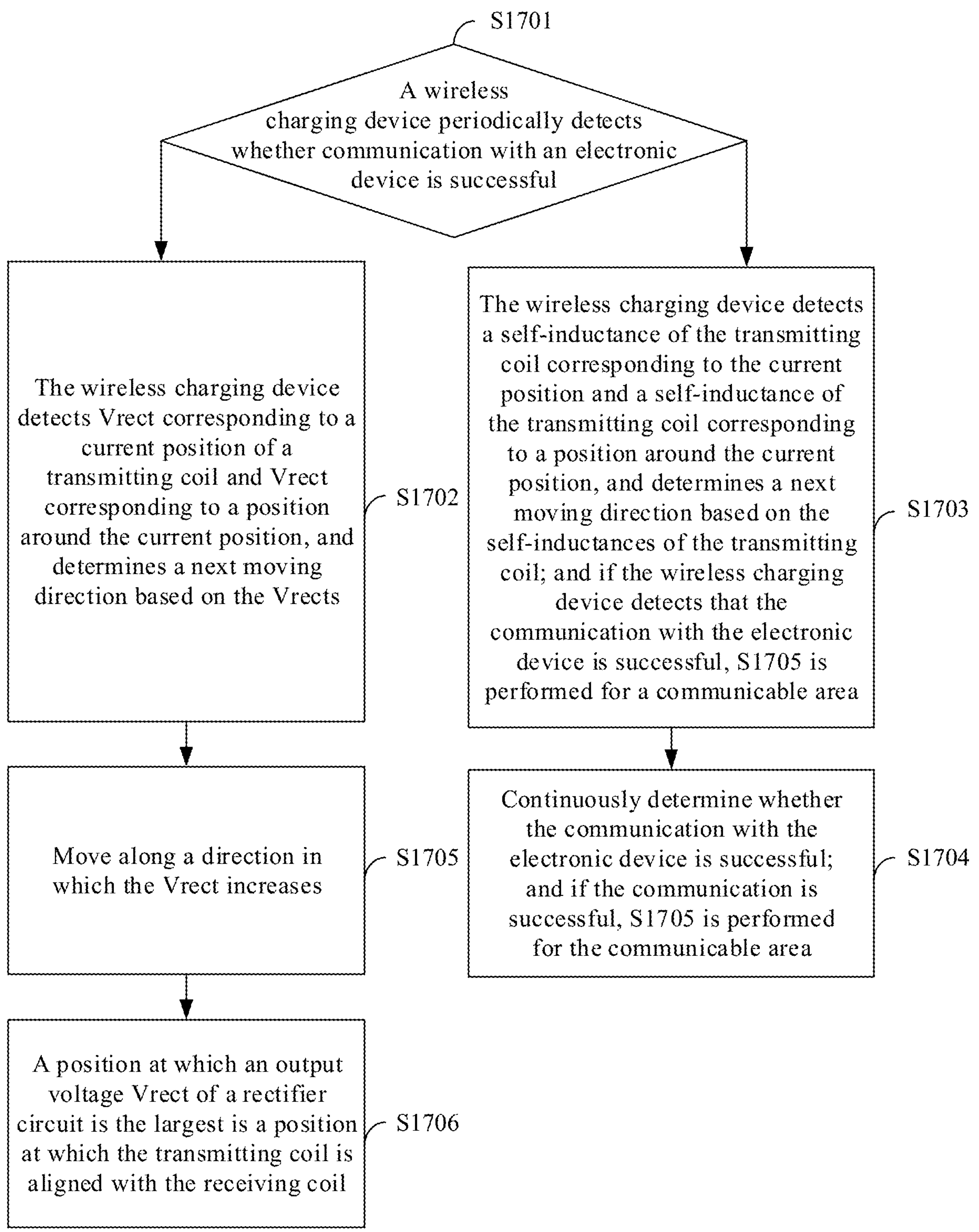
FIG. 17 is a flowchart of yet another alignment method according to an embodiment of this disclosure.

Refer to FIG. 17. FIG. 17 is a flowchart of yet another alignment method according to an embodiment of this disclosure.

S1701: A wireless charging device periodically detects whether communication with an electronic device is successful. When the communication is successful, S1702 is performed. When the communication is not successful, S1703 is performed.

When the communication is successful, the transmitting coil enters a communicable area. When the communication is not successful, it indicates that the transmitting coil is not moved into the communicable area, but is still located in a non-communicable area.

A controller of the wireless charging device may detect whether a data packet sent by the electronic device is received. When no data packet is received and a self-inductance of the transmitting coil is greater than a preset threshold, it is determined that the wireless charging device and the electronic device are in an area where a ping signal can be transmitted but power cannot be received. In other words, the transmitting coil is in the non-communicable area. The alignment step S1703 for the non-communicable area is performed.

When the communication is successful, a moving direction may be determined based on a plurality of charging parameters. When the wireless charging device and the electronic device are in an area where a ping signal can be transmitted and power can be received, the moving direction is determined based on the charging parameters, and the alignment mechanism is controlled to drive the transmitting coil to move until the transmitting coil is aligned with the receiving coil in the electronic device.

The charging parameters monotonously change along the moving direction determined based on the charging parameters, and monotonic changes of different charging parameters may vary. Some charging parameters monotonically increase along the moving direction, and some charging parameters monotonically decrease along the moving direction.

A charging parameter that monotonically increases along the moving direction determined based on the charging parameters includes at least one of the following:

the self-inductance of the transmitting coil, a charging frequency, charging efficiency, an output voltage of a rectifier circuit in the electronic device, a product of the self-inductance of the transmitting coil and an alternating current resistance of the transmitting coil, a mutual inductance between the transmitting coil and the receiving coil, a coupling coefficient between the transmitting coil and the receiving coil, a mutual inductance between the transmitting coil and an auxiliary coil, a coupling coefficient between the transmitting coil and the auxiliary coil, and an open-circuit voltage of an auxiliary coil in the electronic device.

A charging parameter that monotonically decreases along the moving direction determined based on the charging parameters includes at least one of the following:

a current of the transmitting coil and an input voltage of an inverter circuit.

The following describes an example in which when the transmitting coil is in the non-communicable area, a movement of the transmitting coil is controlled based on the output voltage Vrect of the rectifier circuit in the electronic device. Certainly, the movement of the transmitting coil in the non-communicable area may alternatively be controlled based on another charging parameter.

S1702: The wireless charging device detects Vrect corresponding to a current position of the transmitting coil and Vrect corresponding to a position around the current position, and determines a next moving direction based on the Vrects.

It should be noted that, the next moving direction may be determined only when one Vrect corresponding to the current position and Vrects of two different positions on at least two sides around the current position are detected. In other words, the next moving direction is a direction along which the Vrect increases.

In the non-communicable area, the transmitting coil may be controlled to move into the communicable area according to the manner described in any one of Method Embodiment 1 to Method Embodiment 3. Certainly, in the communicable area, the transmitting coil may also be controlled to perform alignment according to the manner described in any one of Method Embodiment 1 to Method Embodiment 3, until positions of the transmitting coil and the receiving coil are aligned.

S1703: The wireless charging device detects a self-inductance of the transmitting coil corresponding to the current position and a self-inductance of the transmitting coil corresponding to a position around the current position, and determines a next moving direction based on the self-inductances of the transmitting coil. If the wireless charging device determines that the communication with the electronic device is successful, S1705 for the communicable area is performed. If the wireless charging device determines that the communication with the electronic device is not successful, S1704 is performed.

S1704: Move the transmitting coil along a direction in which the self-inductance of the transmitting coil increases, and continuously determine whether the communication with the electronic device is successful. If the communication is successful, S1705 for the communicable area is performed.

S1705: Move the transmitting coil along a direction in which the Vrect increases.

As control on the transmitting coil in the communicable area already belongs to a fine adjustment process of the alignment, a distance of each movement may be smaller than a distance of each movement in the non-communicable area. For example, as the control on the transmitting coil in the non-communicable area belongs to a coarse adjustment phase, the transmitting coil moves 5 mm each time; and as the control on the transmitting coil in the communicable area belongs to the fine adjustment phase, the transmitting coil moves 1 mm each time. The foregoing is merely for ease of understanding, and actual values are used as examples. During actual implementation, another value may be selected to control displacement of each movement of the transmitting coil.

S1706: A position at which the output voltage Vrect of the rectifier circuit is the largest is a position at which the transmitting coil is aligned with the receiving coil.

It should be noted that, in the alignment method provided in the foregoing embodiment of this disclosure, in a moving process of alignment, a distance away from the center of the receiving coil may become farther as moving in some movements. However, this is only a normal phenomenon occurring in the moving process. Through gradual iterations, a position of the transmitting coil can be finally aligned with a position of the receiving coil.

In this embodiment, in the non-communicable area, the wireless charging device controls, based on the self-inductance of the transmitting coil, the transmitting coil to perform alignment; and in the communicable area, the wireless charging device may still control, based on the self-inductance of the transmitting coil, the transmitting coil to perform alignment. Certainly, in the non-communicable area, another charging parameter that has a monotonic relationship with the position deviation may be used to control the transmitting coil to perform alignment. For example, in the communicable area, alignment of the transmitting coil may be performed based on Vbus, Icoil, the charging frequency, or Vrect.

Based on the wireless charging device and the alignment method provided in the foregoing embodiments, this embodiment of this disclosure provides a wireless charging system. The following describes the wireless charging system in detail with reference to the accompanying drawings.

Figure 18:
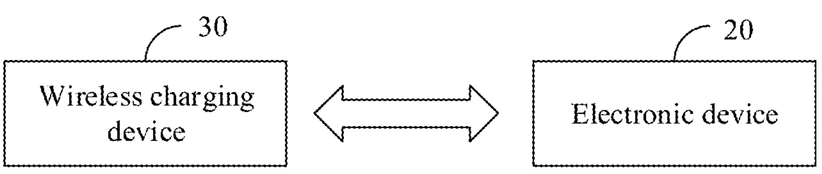
FIG. 18 is a schematic diagram of yet another wireless charging system according to an embodiment of this disclosure.

Refer to FIG. 18. FIG. 18 is a schematic diagram of yet another wireless charging system according to an embodiment of this disclosure.

The wireless charging system provided in this embodiment of this disclosure includes the wireless charging device 30 described in the foregoing embodiments, and further includes an electronic device 20.

The electronic device 20 includes a receiving coil and a rectifier circuit. For a structure of the electronic device, refer to FIG. 13.

The wireless charging device 30 is configured to perform wireless charging on the electronic device 20.

In the wireless charging system provided in this embodiment of this disclosure, because the wireless charging device may automatically implement alignment of the transmitting coil, automatic alignment may be implemented regardless of whether the transmitting coil is in a communicable area or a non-communicable area. In addition, the wireless charging device does not need to add a hardware device, for example, a matrix coil. Therefore, the wireless charging device does not generate an additional interference signal or enlarge a volume of the device. When a position of the transmitting coil is aligned with a position of the receiving coil, power transmission may be started, and the wireless charging device starts to perform wireless charging on the electronic device. Because the position of the transmitting coil is aligned with the position of the receiving coil, wireless charging efficiency can be improved during wireless charging. Because the wireless charging device can implement automatic alignment, a requirement for the electronic device is reduced. In other words, when a user places the electronic device on the wireless charging device for charging, if the position of the electronic device placed by the user is slightly deviated, the transmitting coil automatically moves to perform alignment. This extends a degree of freedom of the wireless charging system and improves user experience of using the electronic device.

Based on the wireless charging device, method, and system that are provided in the foregoing embodiments, this embodiment of this disclosure further provides a wireless charging base, which is configured to perform wireless charging on an electronic device. For example, the electronic device is a mobile phone or a wearable device. When the electronic device is a mobile phone, and the wireless charging base charges the mobile phone, the wireless charging base is horizontally placed on a table top, and the mobile phone is horizontally placed on the wireless charging base. Because a transmitting coil is disposed in the wireless charging base, and a receiving coil is disposed in the mobile phone, energy is transferred between the transmitting coil and the receiving coil through electromagnetic field coupling, thereby implementing wireless charging on the mobile phone.

The wireless charging base provided in this embodiment is configured to perform wireless charging on the electronic device and includes a power interface, a resonant network, an inverter circuit, a controller, a transmitting coil chassis, and an alignment guide rail.

Still refer to FIG. 1. The wireless charging base is numbered 02, a power interface of the wireless charging base 02 is connected to an adapter 40, and the adapter 40 converts mains into a direct current and provides the direct current for the wireless charging base 02.

The power interface is configured to connect the direct current transmitted by the adapter.

The adapter is configured to convert alternating current mains into a direct current, for example, convert the 220 V alternating current mains into a direct current, and provide the direct current for the power interface.

The resonant network includes a resonant capacitor and a transmitting coil.

The transmitting coil chassis is configured to place the transmitting coil.

An input end of the inverter circuit is configured to connect to the power interface, and an output end of the inverter circuit is configured to connect to the resonant network.

The controller is configured to determine a moving direction of the transmitting coil based on a self-inductance of the transmitting coil or a resonant frequency of the resonant network, and control, based on the moving direction of the transmitting coil, the transmitting coil chassis to move on the alignment guide rail, to enable the wireless charging device to align with the electronic device, where the self-inductance of the transmitting coil increases along the moving direction of the transmitting coil, and the resonant frequency decreases along the moving direction of the transmitting coil.

The wireless charging base provided in this embodiment can determine the moving direction based on the self-inductance of the transmitting coil or the resonant frequency of the resonant network, and then control the transmitting coil to move along the moving direction, so that the self-inductance of the transmitting coil increases along the moving direction, and the resonant frequency decreases along the moving direction. In this way, the transmitting coil aligns with the receiving coil. The wireless charging base can automatically control a movement of the transmitting coil to implement alignment with a receiving coil in an electronic device having a wireless charging function, for example, a mobile phone. Therefore, a degree of freedom of wireless charging on the electronic device is increased, a requirement for a user on accuracy of placing a mobile phone is reduced, and user experience is improved.

Figure 19:
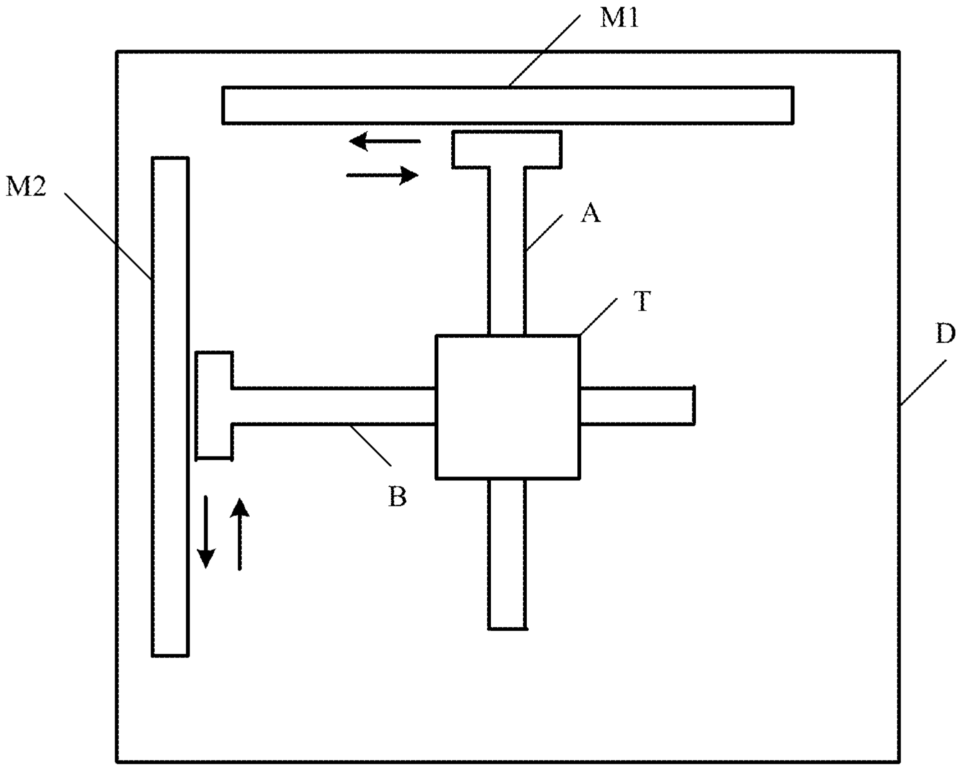
FIG. 19 is a schematic diagram of an alignment mechanism according to an embodiment of this disclosure.

Refer to FIG. 19. FIG. 19 is a schematic diagram of an alignment structure according to an embodiment of this disclosure.

A specific implementation form of the alignment mechanism is not specifically limited in this embodiment of this disclosure. The following describes a simple and feasible implementation.

The alignment guide rail includes at least a first guide rail A and a second guide rail B whose projections on a horizontal plane are perpendicular to each other, and further includes an electric drive member. The electric drive member may drive the transmitting coil to move back and forth along the first guide rail A and the second guide rail B.

A specific implementation of the electric drive member is not specifically limited in this embodiment of this disclosure. The electric drive member may include one or more motor drive elements such as a motor. For example, the electric drive member may be implemented by using a motor. Specifically, the electric drive member may include a first motor M1 and a second motor M2.

It should be noted that the first guide rail A, the second guide rail B, the first motor M1, the second motor M2, and a coil tray T are all disposed on the base D. The base D is configured to support the foregoing components.

The first motor M1 is configured to drive the transmitting coil to move along the first guide rail A.

The second motor M2 is configured to drive the transmitting coil to move along the second guide rail B.

The first guide rail A may correspond to a vertical direction of the horizontal plane, and the second guide rail B may correspond to a horizontal direction of the horizontal plane. To be specific, the first guide rail A may move back and forth in the horizontal direction, and the second guide rail B may move back and forth in the vertical direction.

The controller (not shown in the figure) is configured to control the first motor M1 and the second motor M2, to enable the transmitting coil chassis to move along a moving direction. The controller may control rotation directions of M1 and M2 to enable A and B to move back and forth, and may control rotation angles of M1 and M2 to control specific displacement of the transmitting coil.

In a feasible implementation, as shown in FIG. 1, the wireless charging base is disk-shaped, and the transmitting coil may also be disk-shaped. Certainly, the wireless charging base may be of another shape, and the transmitting coil may also be of another shape.

It should be understood that, in this disclosure, "at least piece (item)" means one or more, and "a plurality of" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

The foregoing descriptions are merely preferred example embodiments of this disclosure, but are not intended to limit this disclosure in any form. Although the preferred embodiments of this disclosure are disclosed above, the embodiments are not intended to limit this disclosure. By using the method and the technical content disclosed above, any persons of ordinary skill in the art can make a plurality of possible changes and modifications on the technical solutions of this disclosure, or amend the technical solutions thereof to be embodiments with equal effects through equivalent variations without departing from the protection scope of the technical solutions of this disclosure. Therefore, any simple amendments, equivalent variations, and modifications made on the above embodiments according to the technical essence of this disclosure without departing from the content of the technical solutions of this disclosure shall fall within the protection scope of the technical solutions of this disclosure.

What is claimed is:

1. A wireless charging device, wherein the wireless charging device is configured to perform wireless charging on an electronic device, and comprises a resonant network, an inverter circuit, a controller, and an alignment mechanism, wherein:

the resonant network comprises a resonant capacitor and a transmitting coil;

one end of the resonant network connects to the inverter circuit, the other end of the resonant network connects to the controller;

the controller is configured to select a moving direction of the transmitting coil based on a self-inductance of the transmitting coil or a resonant frequency of the resonant network, and control a movement of the transmitting coil based on the moving direction of the transmitting coil, to enable the wireless charging device to align with the electronic device, wherein the self-inductance of the transmitting coil increases along the moving direction of the transmitting coil, and the resonant frequency decreases along the moving direction of the transmitting coil; and the controller is further configured to control, based on the moving direction of the transmitting coil, the alignment mechanism to drive the transmitting coil to move along the moving direction, wherein the alignment mechanism comprises at least an electric drive member, a first guide rail, and a second guide rail, the first guide rail and the second guide rail are perpendicular to each other, the electric drive member is configured to drive the transmitting coil to move along the first guide rail and the second guide rail, the controller is configured to control the electric drive member to enable the transmitting coil to move along the moving direction, wherein the controller is configured to control the transmitting coil to move through a closed path around a center with an initial position as the center, to obtain a direction in which the self-inductance of the transmitting coil is the greatest in a movement process of the transmitting coil, and the direction in which the self-inductance of the transmitting coil is the greatest is the moving direction.

2. The wireless charging device according to claim 1, wherein the controller is configured to: when the wireless charging device is at least in a non-communicable area, determine the moving direction of the transmitting coil based on the self-inductance of the transmitting coil or the resonant frequency of the resonant network.

3. The wireless charging device according to claim 2, wherein the controller is configured to: in a non-communicable area, determine the moving direction based on the self-inductance of the transmitting coil or the resonant frequency of the resonant network; and the controller is further configured to: when the wireless charging device and the electronic device are in a communicable area, determine the moving direction based on a charging parameter, wherein the charging parameter monotonically changes along the moving direction based on the charging parameter.

4. The wireless charging device according to claim 3, wherein:

the charging parameter monotonically increases with the movement along the moving direction based on at least one of the following:

the self-inductance of the transmitting coil, a charging frequency, charging efficiency, an output voltage of a rectifier circuit in the electronic device, a product of the self-inductance of the transmitting coil and an alternating current resistance of the transmitting coil, a mutual inductance between the transmitting coil and a receiving coil, a coupling coefficient between the transmitting coil and the receiving coil, a mutual inductance between the transmitting coil and an auxiliary coil, a coupling coefficient between the transmitting coil and the auxiliary coil, or an open-circuit voltage of an auxiliary coil in the electronic device; or the charging parameter monotonically decreases with the movement along the moving direction based on at least one of the following:

a current of the transmitting coil and an input voltage of the inverter circuit.

5. The wireless charging device according to claim 2, wherein the controller is further configured to: when no data packet sent by the electronic device is received, and the self-inductance of the transmitting coil is greater than a preset threshold, determine that the wireless charging device and the electronic device are in a non-communicable area.

6. The wireless charging device according to claim 1, wherein the controller is configured to control the transmitting coil to move along a circle of a preset radius with the initial position as the center, to obtain the direction in which the self-inductance of the transmitting coil is the greatest in a process that the transmitting coil moves on the circumference.

7. The wireless charging device according to claim 1, wherein the controller is configured to: control the transmitting coil to move around a starting point separately to a first point and a second point with an initial position as the starting point, wherein the starting point, the first point, and the second point form a triangle; and determine the moving direction based on a self-inductance of the transmitting coil corresponding to each of the first point and the second point.

8. The wireless charging device according to claim 7, wherein the starting point is a common vertex of two right-angled sides of a right triangle, and the first point and the second point are other two vertices of the two right-angled sides respectively.

9. The wireless charging device according to claim 1, wherein the controller is further configured to obtain the self-inductance of the transmitting coil based on the resonant frequency of the resonant network and the resonant capacitor of the resonant network.

10. A wireless charging system, comprising a wireless charging device, and further comprising an electronic device, wherein the electronic device comprises a receiving coil and a rectifier circuit; and the wireless charging device is configured to perform wireless charging on the electronic device;

wherein the wireless charging device comprises a resonant network, an inverter circuit, a controller, and an alignment mechanism, wherein the resonant network comprises a resonant capacitor and a transmitting coil;

one end of the resonant network connects to the inverter circuit, the other end of the resonant network connects to the controller;

the controller is configured to select a moving direction of the transmitting coil based on a self-inductance of the transmitting coil or a resonant frequency of the resonant network, and control a movement of the transmitting coil based on the moving direction of the transmitting coil, to enable the wireless charging device to align with the electronic device, wherein the self-inductance of the transmitting coil increases along the moving direction of the transmitting coil, and the resonant frequency decreases along the moving direction of the transmitting coil; and the controller is further configured to control, based on the moving direction of the transmitting coil, the alignment mechanism to drive the transmitting coil to move along the moving direction, wherein the alignment mechanism comprises at least an electric drive member, a first guide rail, and a second guide rail, the first guide rail and the second guide rail are perpendicular to each other, the electric drive member is configured to drive the transmitting coil to move along the first guide rail and the second guide rail, the controller is configured to control the electric drive member to enable the transmitting coil to move along the moving direction, wherein the controller is configured to control the transmitting coil to move through a closed path around a center with an initial position as the center, to obtain a direction in which the self-inductance of the transmitting coil is the greatest in a movement process of the transmitting coil, and the direction in which the self-inductance of the transmitting coil is the greatest is the moving direction.

11. The wireless charging system according to claim 10, wherein the controller is configured to: when the wireless charging device is at least in a non-communicable area, determine the moving direction of the transmitting coil based on the self-inductance of the transmitting coil or the resonant frequency of the resonant network.

12. The wireless charging system according to claim 10, wherein the closed path comprises a circle.

13. A wireless charging base, configured to perform wireless charging on an electronic device, comprising: a power interface, a resonant network, an inverter circuit, a controller, a transmitting coil chassis, and an alignment guide rail, wherein the power interface is configured to connect a direct current transmitted by an adapter;

the resonant network comprises a resonant capacitor and a transmitting coil;

the transmitting coil chassis is configured to place the transmitting coil;

one end of the resonant network connects to the inverter circuit, the other end of the resonant network connects to the controller; and the controller is configured to select a moving direction of the transmitting coil based on a self-inductance of the transmitting coil or a resonant frequency of the resonant network, and control, based on the moving direction of the transmitting coil, the transmitting coil chassis to move on the alignment guide rail, to enable the wireless charging device to align with the electronic device, wherein the self-inductance of the transmitting coil increases along the moving direction of the transmitting coil, and the resonant frequency decreases along the moving direction of the transmitting coil;

wherein the alignment guide rail comprises at least a first guide rail and a second guide rail whose projections on a horizontal plane are perpendicular to each other and further comprises an electric drive member;

the electric drive member is configured to drive the transmitting coil to move along the first guide rail and the second guide rail; and the controller is configured to control the electric drive member, to enable the transmitting coil to move along the moving direction, wherein the controller is configured to control the transmitting coil to move through a closed path around a center with an initial position as the center, to obtain a direction in which the self-inductance of the transmitting coil is the greatest in a movement process of the transmitting coil, and the direction in which the self-inductance of the transmitting coil is the greatest is the moving direction.

14. The wireless charging base according to claim 13, wherein the wireless charging base is disk-shaped and the transmitting coil is disk-shaped.

15. The wireless charging base according to claim 13, wherein the closed path comprises a circle.

* * * * *